Dec. 15, 1936.  J. A. HECKMAN  2,064,470
OVERHEAD DOOR
Filed Jan. 17, 1931    14 Sheets-Sheet 1
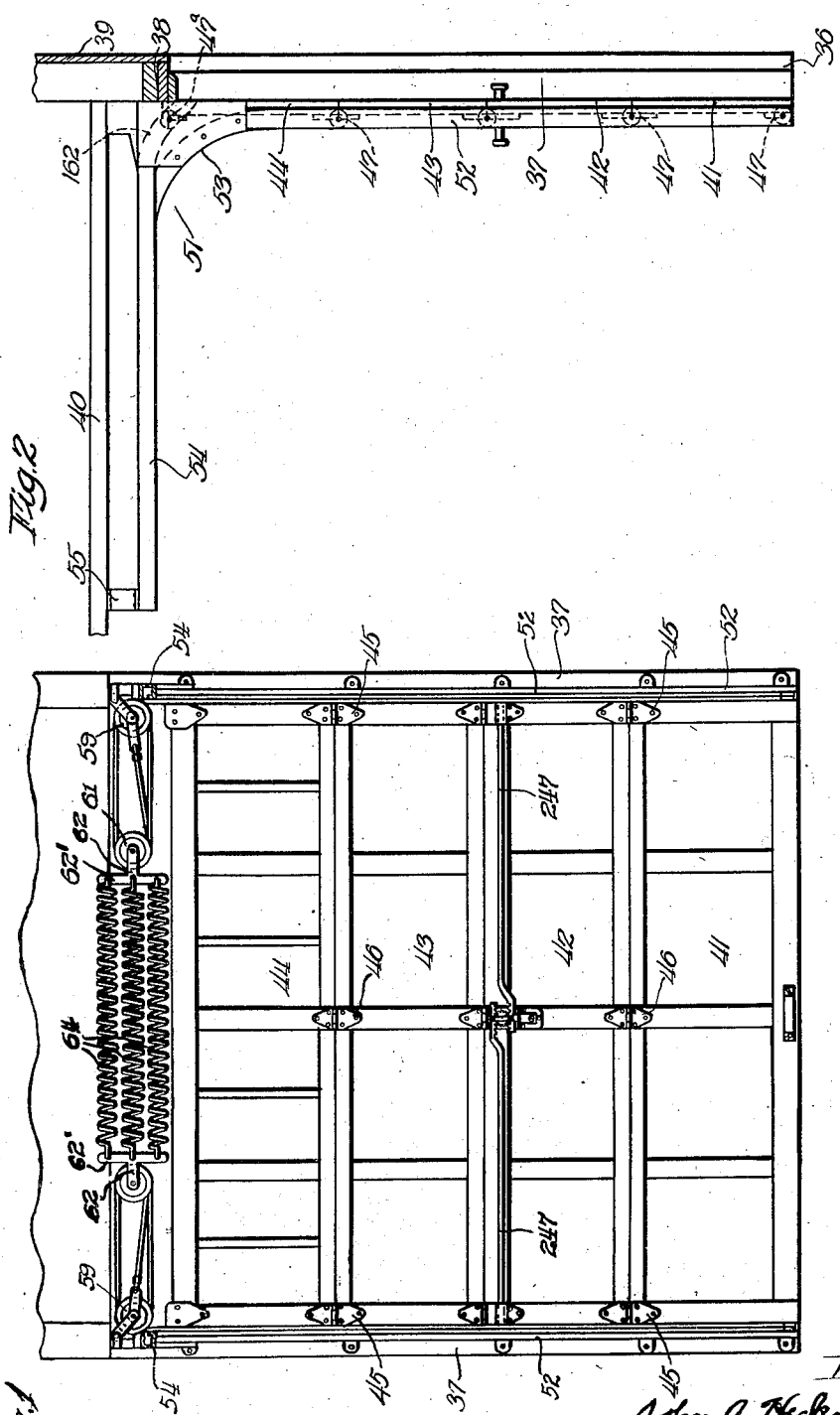
Inventor:
John A. Heckman
By Brown, Jackson, Boettcher & Dienner
Attys.

Dec. 15, 1936.  J. A. HECKMAN  2,064,470
OVERHEAD DOOR
Filed Jan. 17, 1931  14 Sheets-Sheet 2
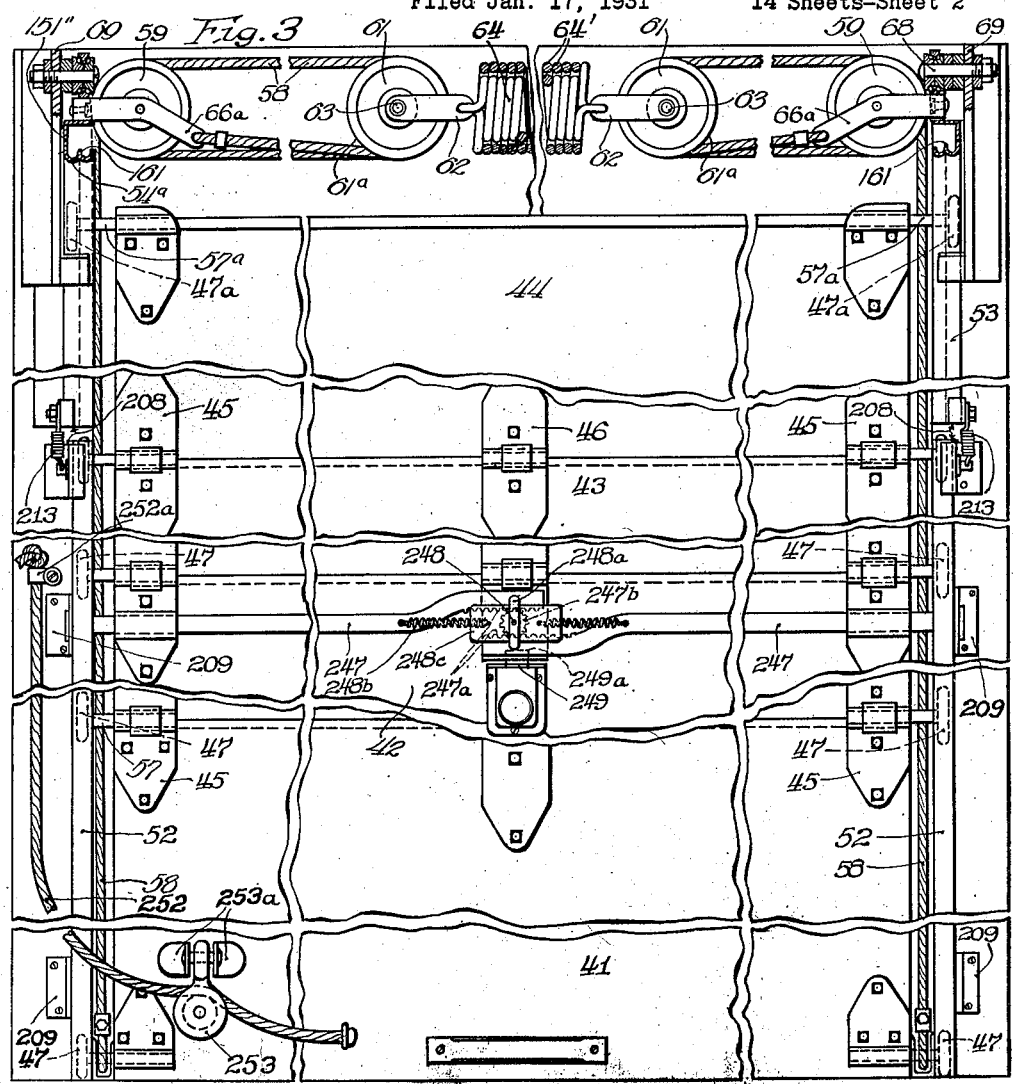
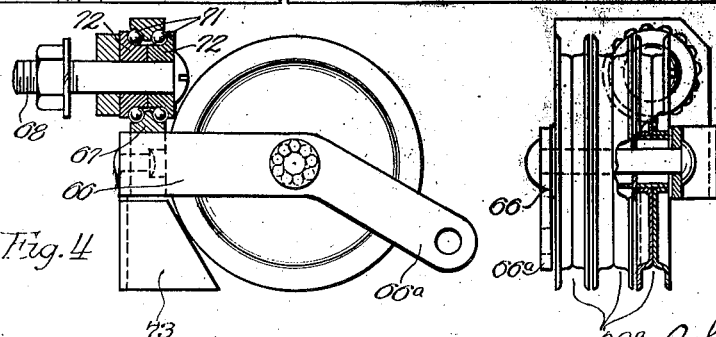
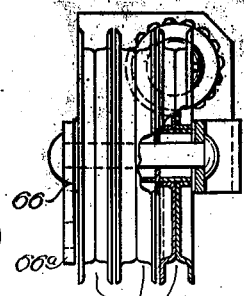
Inventor
John A. Heckman
By Brown, Jackson, Boettcher & Dienner
Attys.

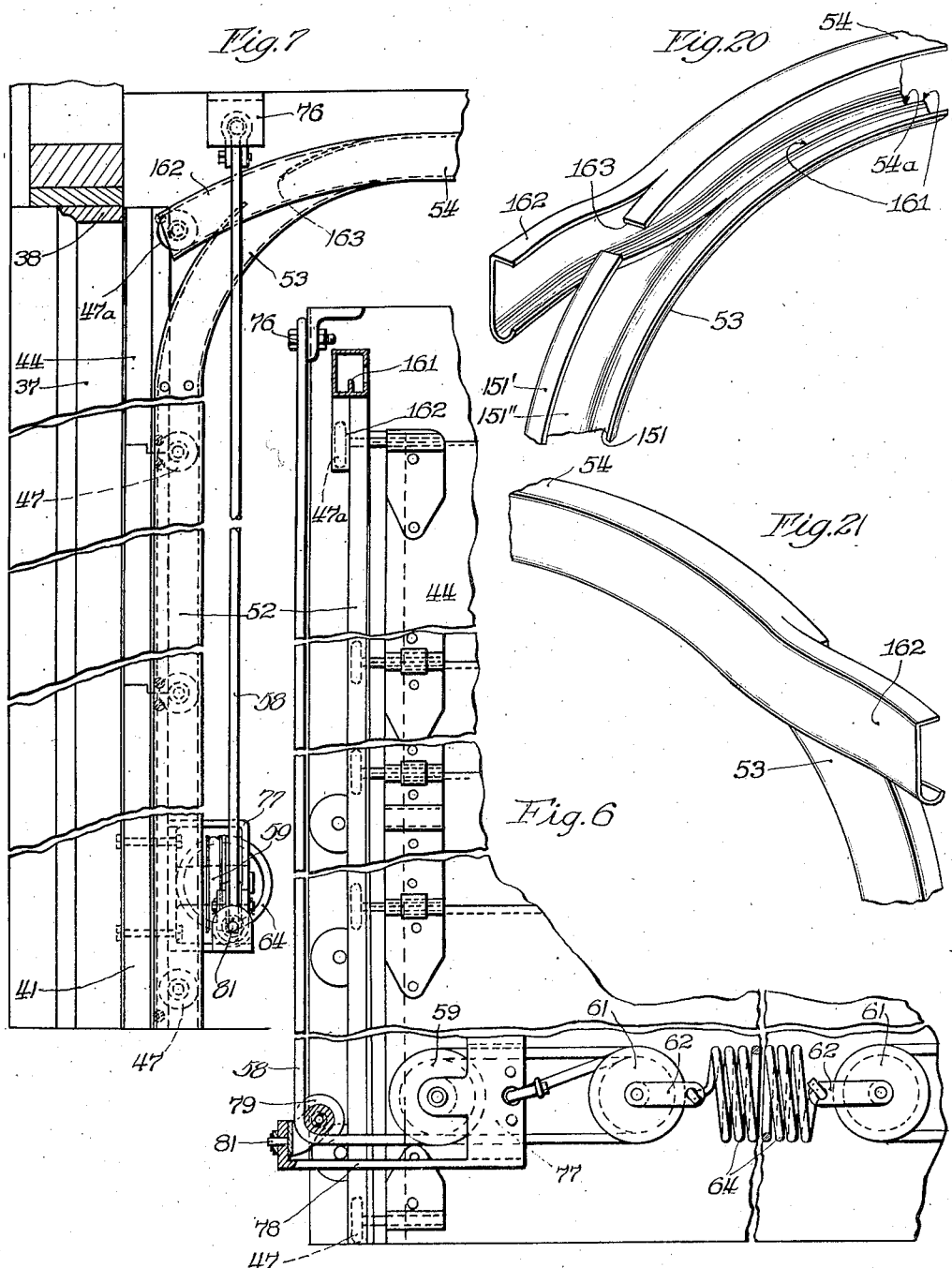

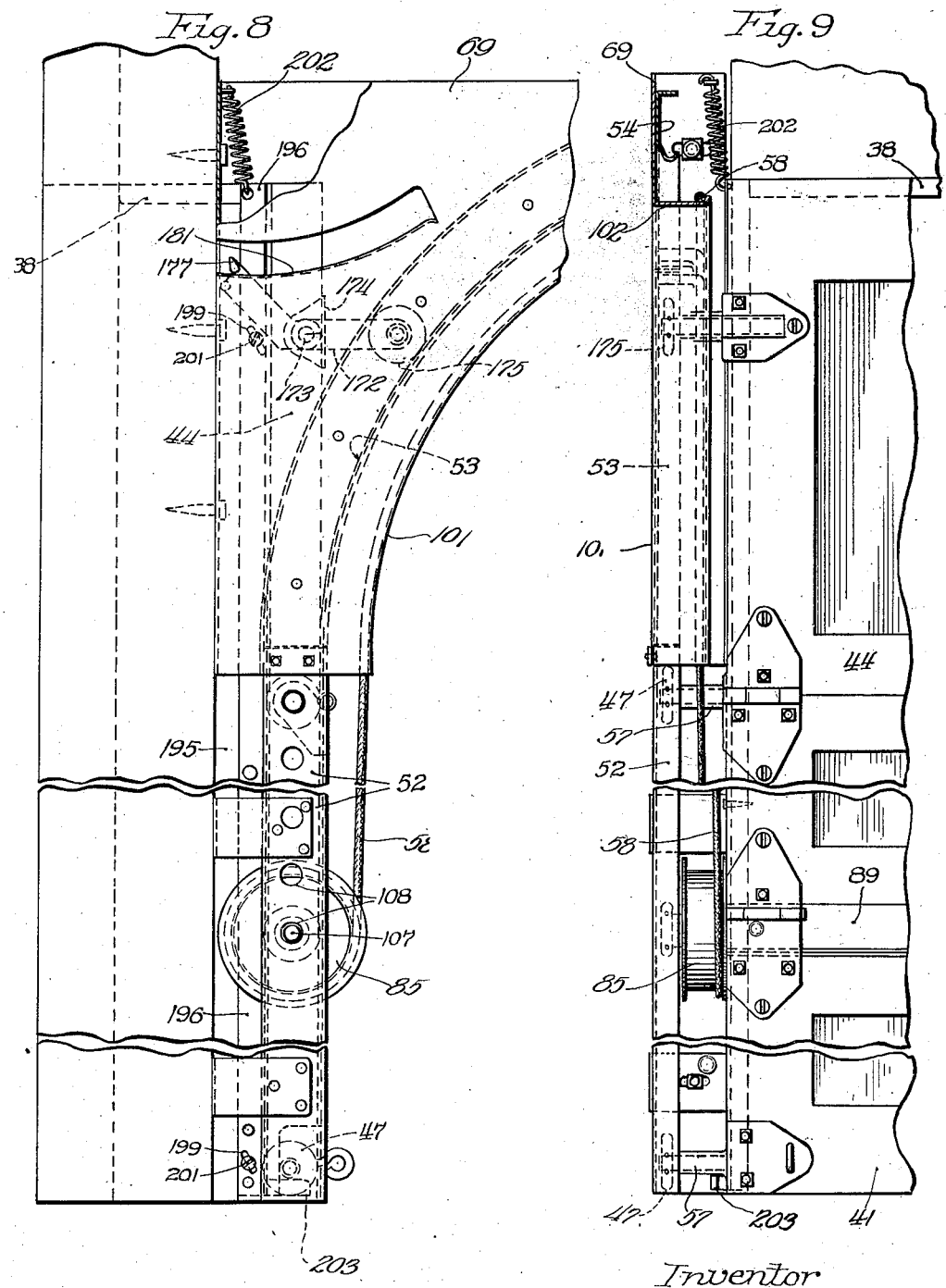

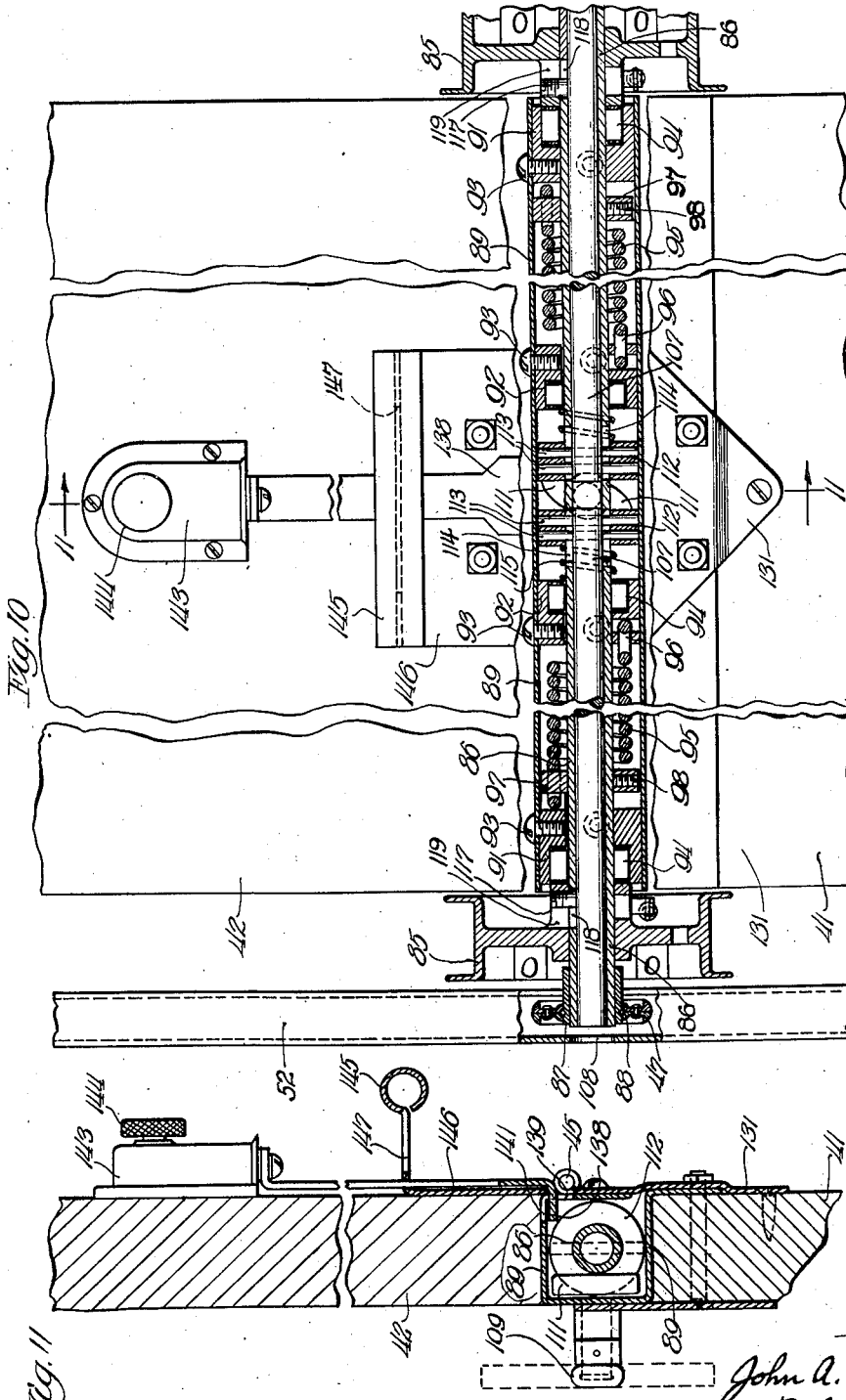

Dec. 15, 1936.  J. A. HECKMAN  2,064,470
OVERHEAD DOOR
Filed Jan. 17, 1931  14 Sheets-Sheet 6
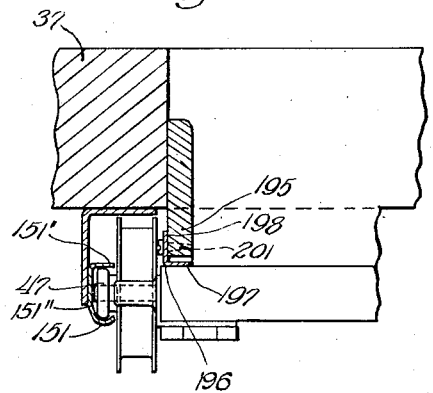
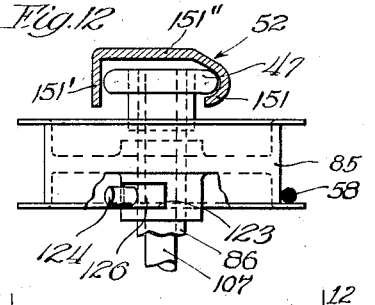
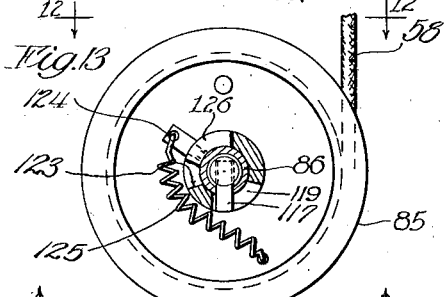
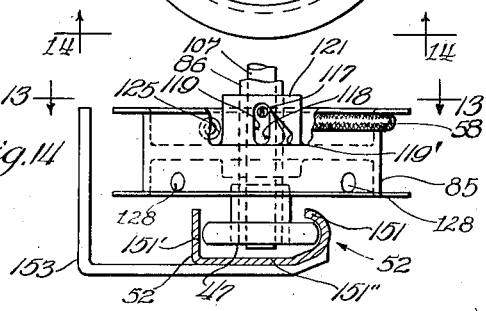
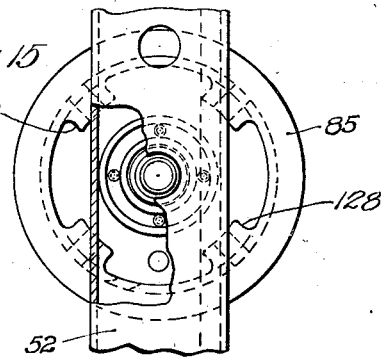
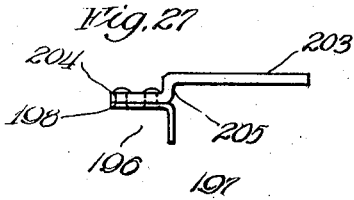
Inventor:
John A. Heckman
By Brown, Jackson, Boettcher & Dienner
Attys.

Dec. 15, 1936. J. A. HECKMAN 2,064,470
OVERHEAD DOOR
Filed Jan. 17, 1931 14 Sheets-Sheet 7
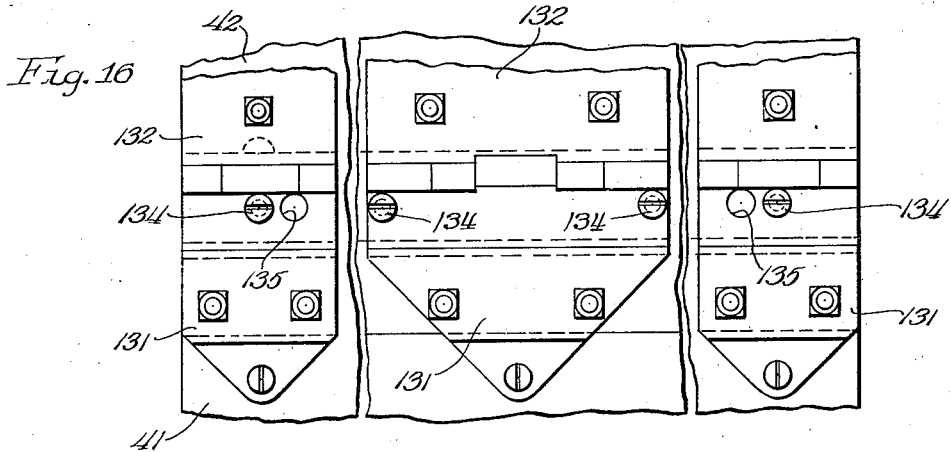
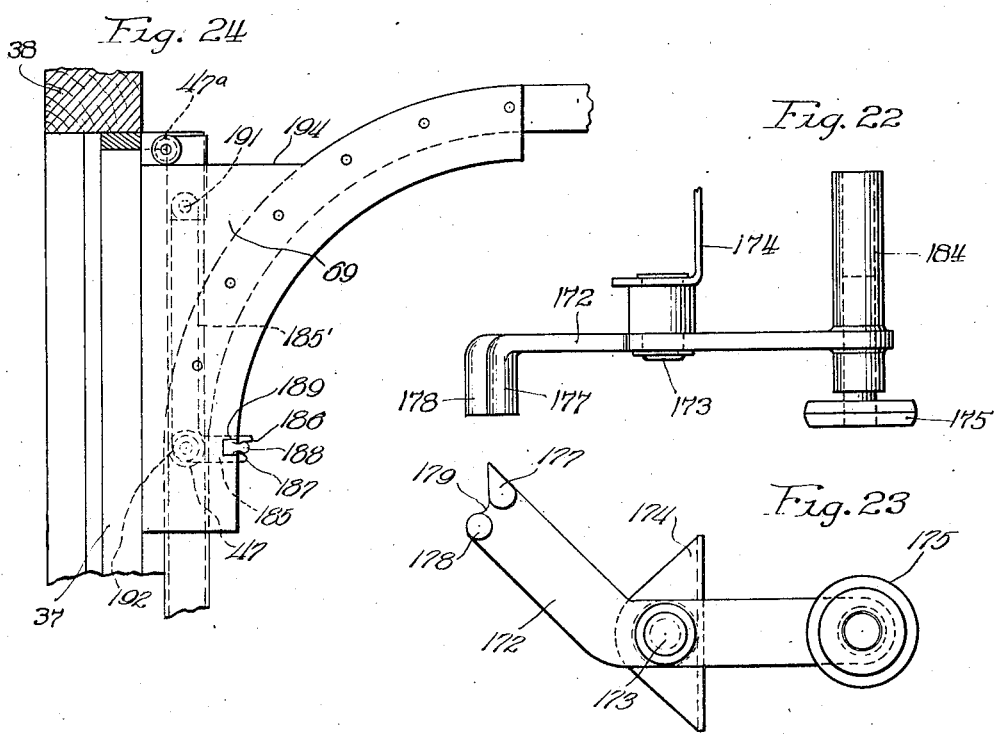
Inventor
John A. Heckman
By Brown, Jackson, Boettcher & Dienner
Attys.

Dec. 15, 1936.  J. A. HECKMAN  2,064,470
OVERHEAD DOOR
Filed Jan. 17, 1931  14 Sheets-Sheet 8
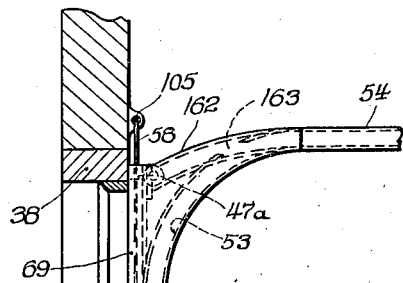
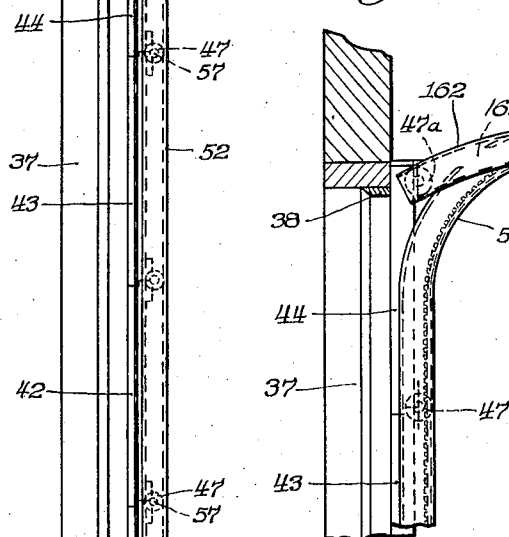
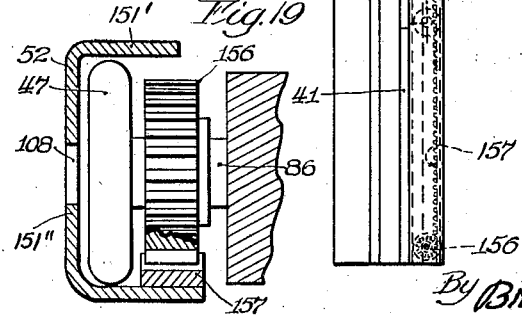
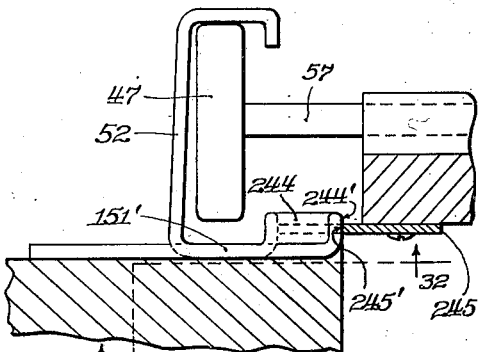
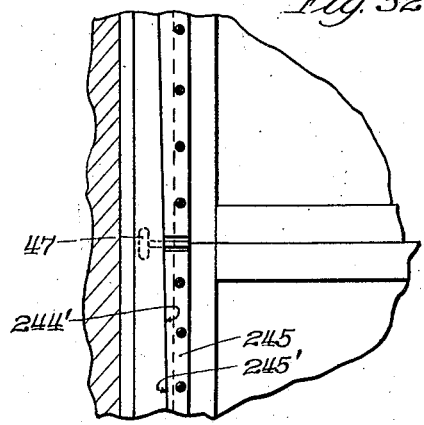

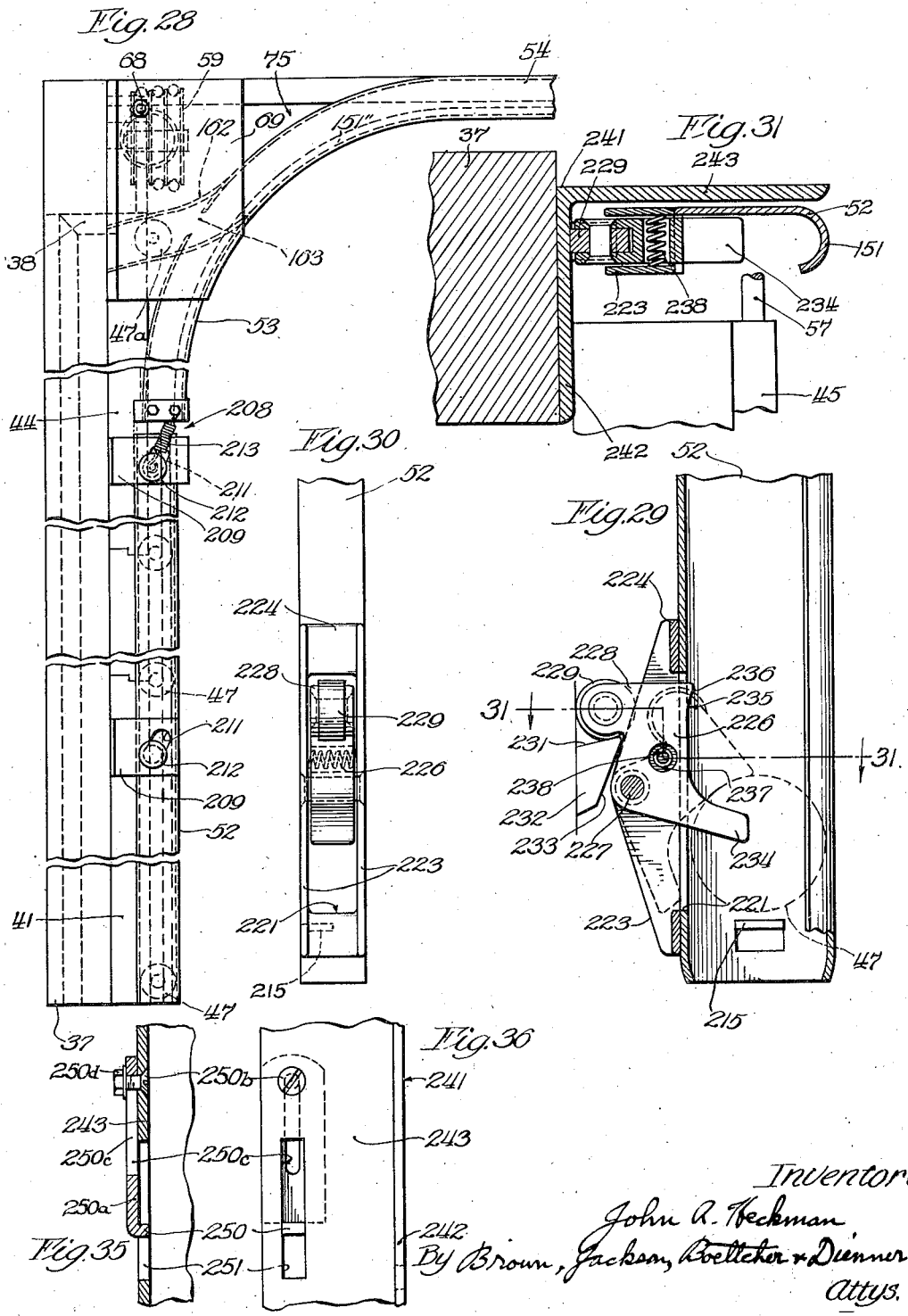

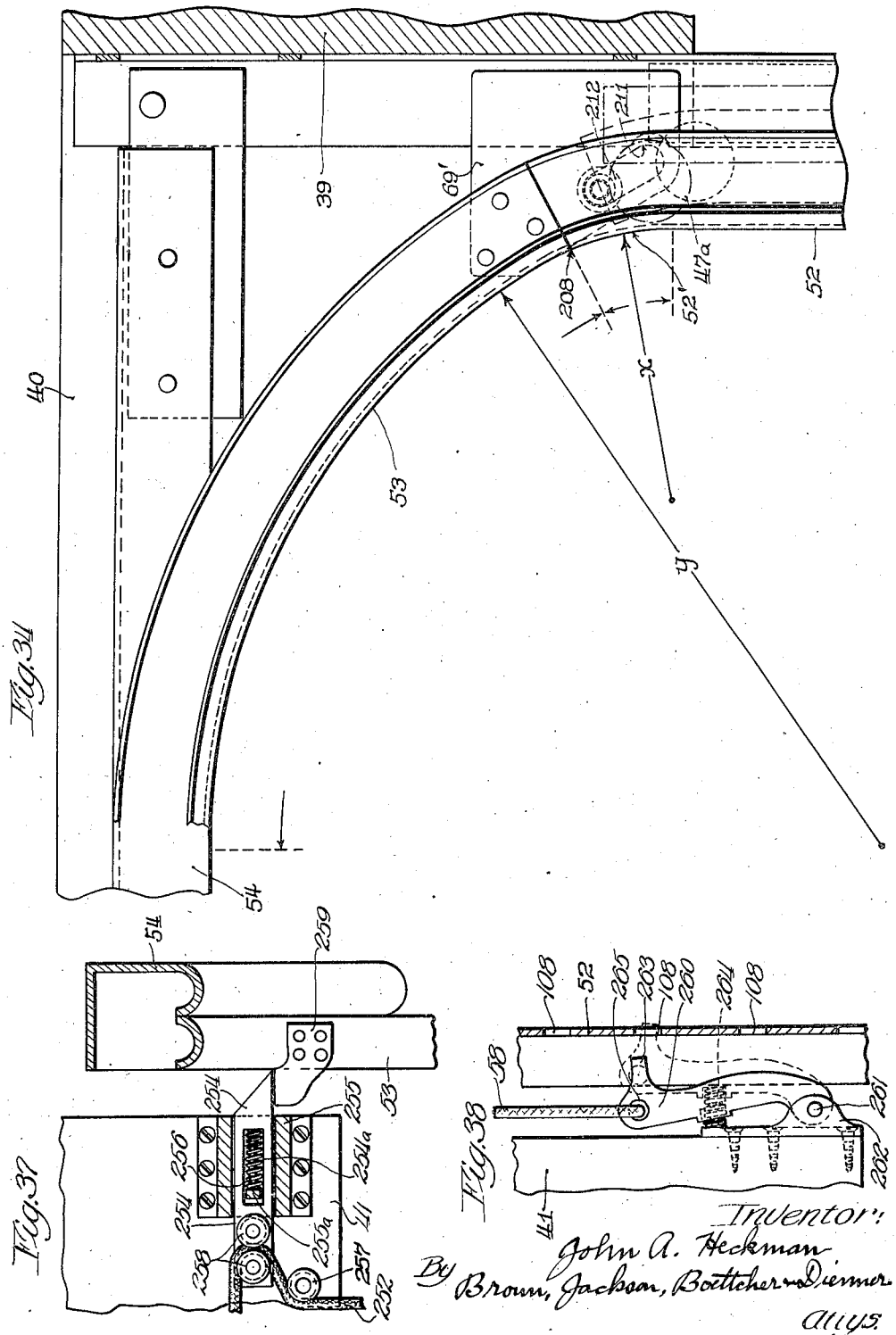

Dec. 15, 1936.    J. A. HECKMAN    2,064,470
OVERHEAD DOOR
Filed Jan. 17, 1931    14 Sheets—Sheet 11
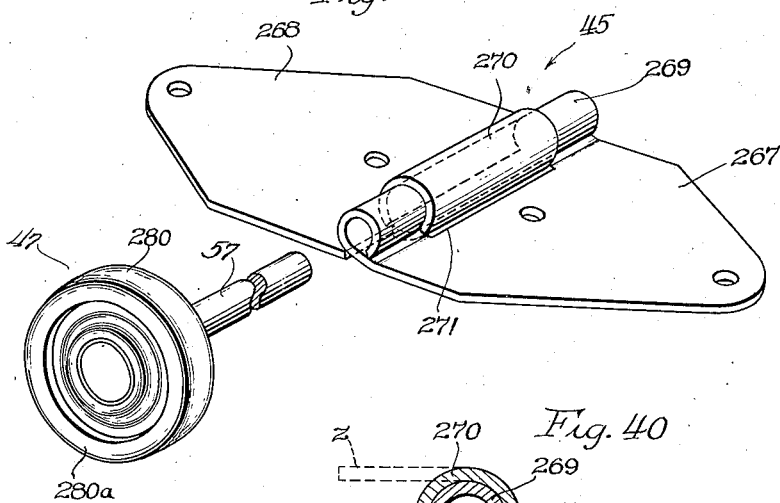
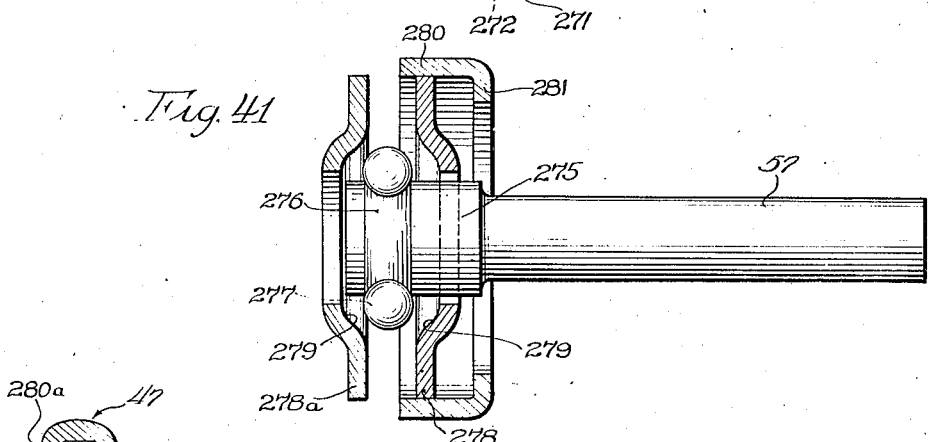
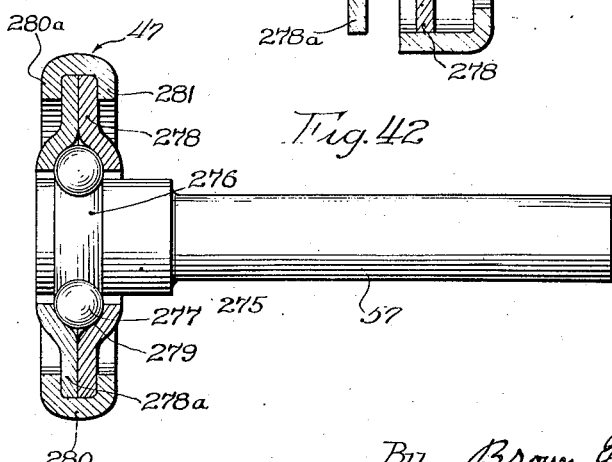
Inventor
John A. Heckman
By Brown, Jackson, Boettcher & Dienner
Attys.

Dec. 15, 1936.   J. A. HECKMAN   2,064,470
OVERHEAD DOOR
Filed Jan. 17, 1931   14 Sheets—Sheet 12

Inventor
John A. Heckman
By Brown, Jackson, Boettcher & Dienner
Attys.

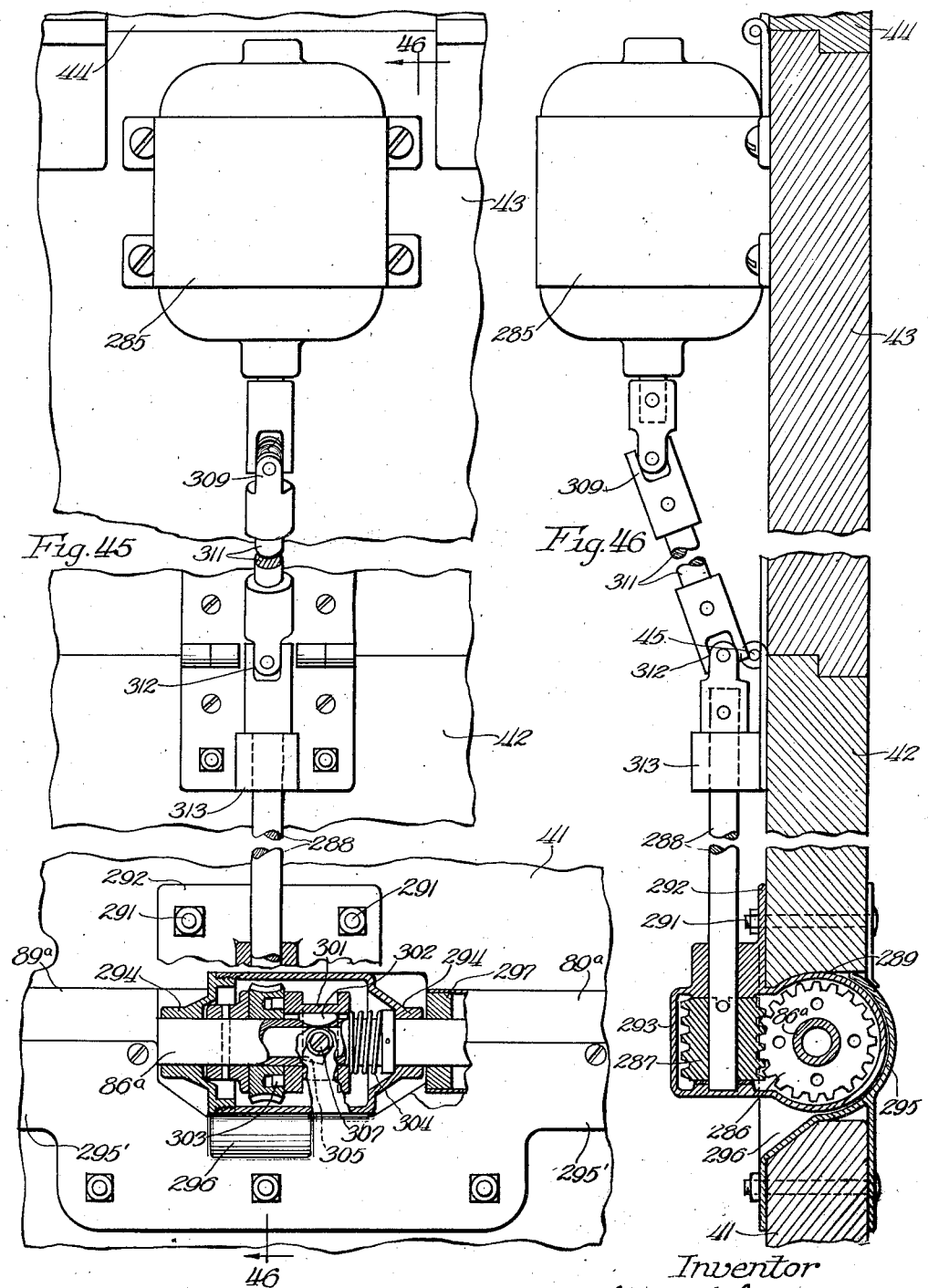

Dec. 15, 1936. J. A. HECKMAN 2,064,470
OVERHEAD DOOR
Filed Jan. 17, 1931 14 Sheets-Sheet 14
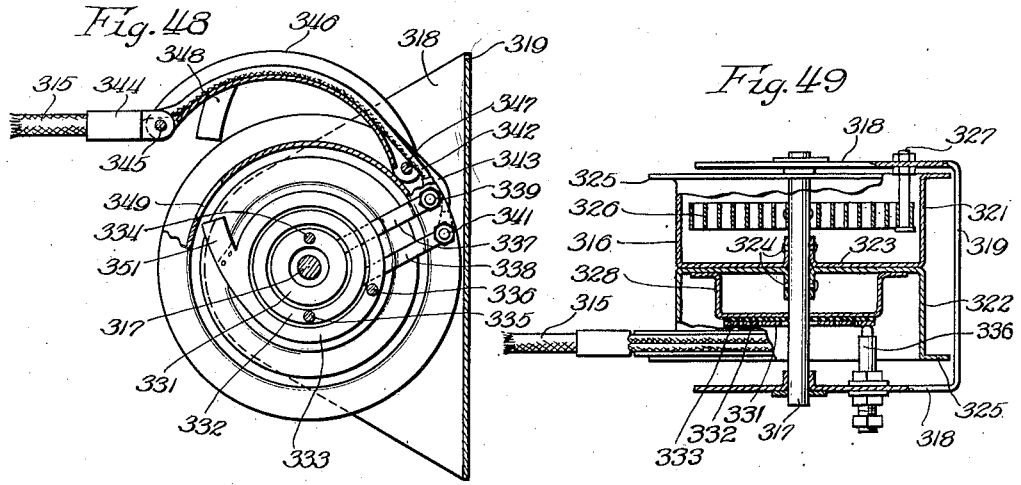
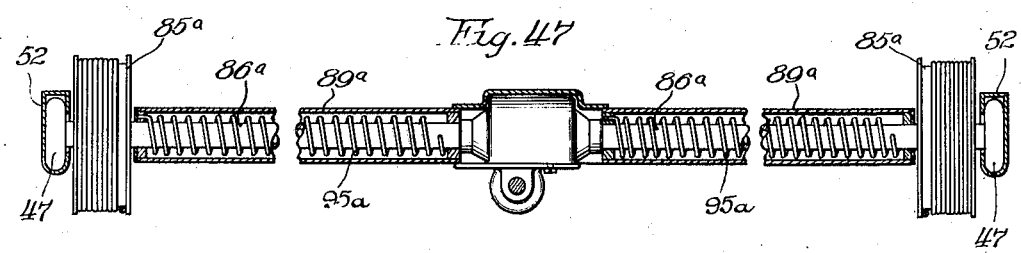
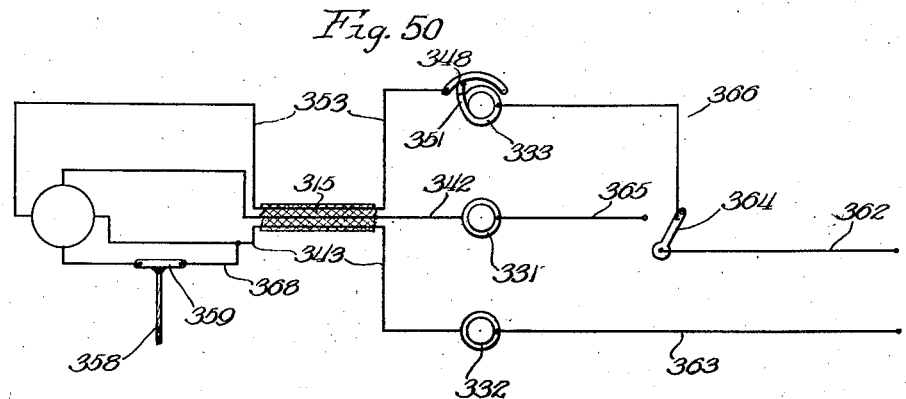
Inventor
John A. Heckman.
By Brown, Jackson, Boettcher & Dienner
Attys.

Patented Dec. 15, 1936

2,064,470

UNITED STATES PATENT OFFICE 2,064,470

OVERHEAD DOOR

John A. Heckman, Lincoln, Nebr., assignor, by direct and mesne assignments, to Richards-Wilcox Manufacturing Company, Aurora, Ill., a corporation of Illinois Application January 17, 1931, Serial No. 509,430

26 Claims. (Cl. 20—20)

The present invention relates to overhead doors of the general type adapted to be moved from a substantially vertical closed position to an approximately horizontal open position adjacent to or above the top of the doorway. Doors of this type have particular application to garages and in the following disclosures of preferred embodiments of my invention I have shown constructions particularly designed for garages, although it will be understood that the invention is not limited to this specific type of closure.

These doors generally comprise a series of horizontally disposed, hingedly connected panels having rollers at their side edges which travel in tracks at the sides of the doorway. Said tracks comprise substantially vertical portions for holding the door in its closed position, and substantially horizontal or inwardly extending portions for supporting the door in its open or overhead position. The vertical and horizontal portions of the tracks are joined by curved portions of sufficient radius to enable the panels to easily move from the vertical portions to the horizontal portions in traveling between open and closed positions of the door. One of the principal problems encountered in the average garage installation is that of overhead clearance between the level of the top of the doorway and the roof of the garage or the structural supports for the roof, and accordingly it is necessary to design these overhead door structures so that only a minimum vertical space is required to accommodate the overhead portions of the tracks, the counterbalancing means, and the movement of the door between open and closed positions.

One of the objects of the invention is to provide improved means for counterbalancing the door and, more specifically, to provide a spring arrangement of counterbalancing means which equalizes the counterbalancing forces effective at opposite edges of the door, and also to provide counterbalancing means which is carried by the door structure. In one representative form of my invention the counterbalancing means comprises a novel relation of spring means and cable sheaves disposed above the doorway in a compact arrangement which only requires a small amount of vertical space above the doorway, the spring means and cable sheaves cooperating to equalize the counterbalancing forces effective at opposite edges of the door. In another form of my invention the counterbalancing means is carried by the door structure, such arrangement completely obviating the necessity for any space above or below the horizontal track portions or at any other point to accommodate the counterbalancing means.

Another object of the invention is to provide improved means for controlling the top panel of the door. As I have previously remarked, in a large proportion or perhaps the majority of garage installations the overhead clearance above the top of the doorway is quite limited; accordingly, it is necessary in these installations to have the horizontal portions of the tracks disposed at a level close to the top of the doorway or perhaps even below the top. In such cases, the curved portions of the tracks must start their rearward curvature at a point below the top of the doorway and this introduces a problem in causing the top of the upper panel to move into closed position against the upper portions of the jambs and against the top of the doorway. My invention embodies improved means which effectively closes the top panel against the doorway and which does not require any additional vertical clearance.

Another object of the invention is to provide improved means for obtaining a weathertight closure between the sides of the door and the doorway. When the door is being moved downwardly towards its closed position or upwardly towards its open position its travel in the substantially vertical portions of the tracks should be unhindered by any appreciable frictional engagement with the jambs or other portions of the doorway, otherwise it will be difficult to open and close the door and the action of the counterbalancing means will be irregular. However, when the door is in its closed position a substantially weather-tight joint should be established between the sides of the door and the doorway to exclude snow, rain and cold, and to prevent rattling of the door by the wind. My invention provides improved means for effecting this weathertight closure without opposing frictional resistance to the travel of the door when moving towards or away from its closed position.

Another object of the invention is to provide an improved construction and arrangement of electric motor driven operating mechanism for this general type of door; and to provide improved control means for the electric motor.

Other objects of my invention are to provide improved safety means for instantly arresting the descent of the door if one of the counterbalancing cables should break or if the counterbalancing means should otherwise be rendered ineffective; to provide improved locking means for locking the door in its closed position; to provide an improved construction of guide roller; and to otherwise improve upon the hardware and fittings for this general type of door, as will hereinafter appear from the following description. While the present disclosures of my invention have been devised primarily for garage installations, nevertheless it will be understood that certain fundamental principles of my invention can be embodied in pier doors and other types of closures where the closure member is moved more or less vertically between its open and closed positions.

In the accompanying drawings illustrating preferred embodiments of my invention:

Figure 1 is an elevational view of one form of my improved door in its closed position, as viewed from the inner side of the doorway;

Figure 2 is a vertical sectional view through the doorway;

Figure 3 is an inner elevational view, partly in section, of one embodiment of my invention showing the counterbalancing means disposed above the doorway, intermediate portions of the door being broken away to reduce the height of the illustration;

Figure 4 is a side view, partly in section, of one of the swiveled sheave blocks forming part of the counterbalancing mechanism;

Figure 5 is an end view of one of these sheave blocks;

Figure 6 is an inner fragmentary view of a modified construction in which the same general type of counterbalancing mechanism is mounted directly on the door;

Figure 7 is a fragmentary side view of the latter construction;

Figures 8–16 are different views of a modified construction wherein the counterbalancing mechanism is also mounted directly on the door, Figure 8 being a fragmentary side elevational view of this modified embodiment;

Figure 9 is a fragmentary inner view, partly in section, of this latter embodiment;

Figure 10 is also a fragmentary inner view on a larger scale, showing in longitudinal section the details of this modified form of counterbalancing mechanism;

Figure 11 is a vertical sectional view taken approximately on the plane of the line 11—11 of Figure 10;

Figure 12 is a side elevational view of one of the winding drums, viewed in the direction of the arrows 12—12 of Figure 13, a portion thereof being broken away to illustrate details;

Figure 13 is an end elevational view, partly in section, of said winding drum, corresponding to a view along the plane of the line 13—13 of Figure 14;

Figure 14 is a side elevational view of the winding drum, viewed in the direction of the arrows 14—14 of Figure 13, with a portion broken away to illustrate details;

Figure 15 is an end view showing one of the guide tracks partly in section and showing the other end or side of the winding drum;

Figure 16 is a fragmentary elevational view showing the panel hinge connections associated with the latter embodiment of counterbalancing mechanism;

Figure 17 is a side view, partly diagrammatic, showing a different arrangement of the cables for the latter type of counterbalancing mechanism;

Figure 18 is a similar view showing the use of pinions and racks for the latter type of counterbalancing mechanism instead of winding drums and cables;

Figure 19 is a horizontal sectional view through one of the guide tracks equipped with a rack, for use with the construction illustrated in Figure 18;

Figures 20 and 21 are detail perspective views showing the juncture between the main overhead portions of the guide tracks and the deflecting track portions for controlling the top panel;

Figures 22 and 23 are plan and side elevational views, respectively, of a modified form of top panel controlling mechanism;

Figure 24 is a fragmentary side elevational view of a portion of the door and adjacent guide track structure, showing another modified form of top panel controlling mechanism;

Figure 25 is a horizontal sectional view through one edge of the door showing one form of sealing means for effecting a weather-tight joint between the door and doorway;

Figure 26 is a fragmentary side elevational view of one of the shiftable jamb members used in the type of sealing means illustrated in Figure 25;

Figure 27 is a bottom end view of one of the shiftable jamb members;

Figure 28 is a fragmentary side elevational view of an installation employing a modified construction of sealing means wherein the lower track portions are mounted for shifting movement;

Figure 29 is a longitudinal sectional view through the lower portion of one of these shiftable track sections, illustrating one form of mechanism for positively lifting the track section and for holding it in lifted position;

Figure 30 is a front elevational view of the latter construction;

Figure 31 is a transverse sectional view taken approximately on the plane of the line 31—31 of Figure 29;

Figure 32 is a view, partly in elevation and partly in section, along one edge of the door as viewed from the outer side thereof, showing a different method of obtaining a weather-tight joint between the door and doorway, this view corresponding substantially to a section taken on the plane of the line 32—32 of Figure 33;

Figure 33 is a view, partly in section, looking upwardly along the line of the guide track illustrated in Figure 32;

Figure 34 is a side elevational view, on a larger scale, of the upper portion of a modified construction, wherein the top edge of the upper panel is also moved to closed position by the shiftable track sections;

Figures 35 and 36 are detail views illustrating an adjustable keeper which can be associated with the locking mechanisms of any of the preceding embodiments;

Figure 37 is a detail view of a form of latch mechanism which may be employed to hold the door in open position;

Figure 38 is a detail view of a simplified form of locking mechanism for automatically arresting descent of the door if the cable should break;

Figure 39 is a perspective view of an improved construction of hinge devised for these overhead doors;

Figure 40 is a longitudinal sectional view through this hinge, taken on the median plane of Figure 39;

Figure 41 is a longitudinal sectional view of an improved type of guide wheel or roller for these overhead doors, with the parts thereof shown in separated relation;

Figure 42 is a similar sectional view showing the wheel completely formed;

Figure 45 is an inner elevational view on a larger scale, partly in section, showing the driving relation between the electric motor and the shaft which carries the winding drums at the sides of the door;

Figure 46 is a transverse vertical sectional view taken approximately on the plane of the line 46—46 of Figure 45;

Figure 47 is a horizontal sectional view taken approximately on the axial plane of said winding drums;

Figure 48 is a side view, partly in section, of the spring reel or drum for winding up the conductor cable leading to the electric motor on the door;

Figure 49 is a horizontal axial sectional view through this spring reel; and

Figure 50 is a circuit diagram of the electrical connections which may be employed in this electrically operated type of door.

Figure 43:
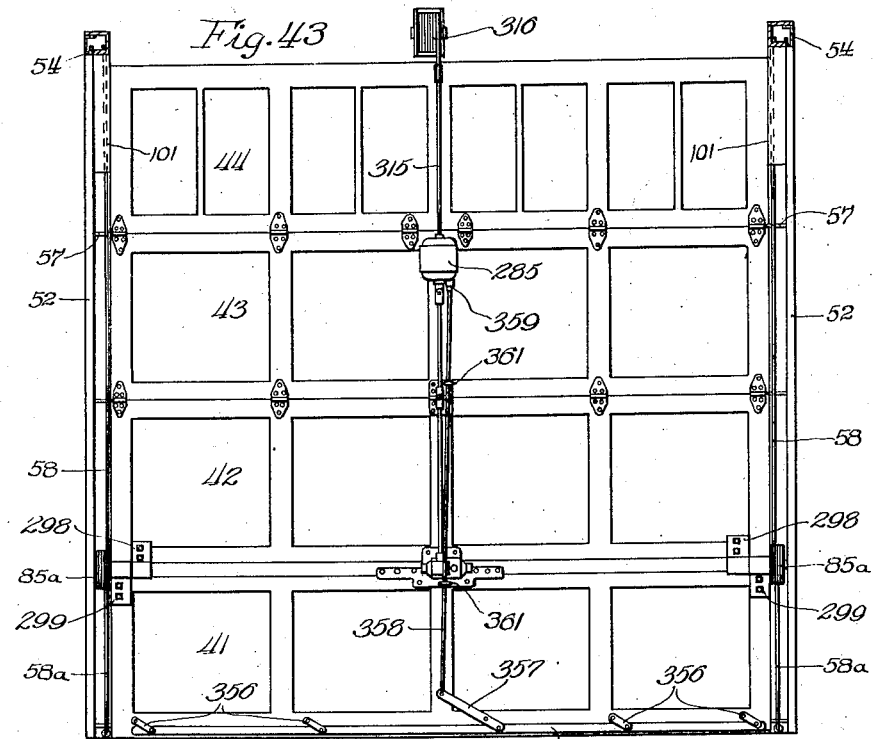
Figure 43 is an elevational view of the inner side of the present type of door, provided with motor driven operating mechanism.

Referring first to Figures 1 and 2, which show the main parts of a typical installation, the doorway 36 of the garage is defined between the usual side jambs 37 and the upper lintel or cross bar 38. The front wall 39 of the garage continues from the lintel 38 up to the roof, and the walls or roof may be braced by any suitable arrangement of longitudinal or transverse cross braces 40 typical of ordinary garage construction.

The present door comprises a series of horizontally extending panels or sections, there being four of these panels 41, 42, 43, and 44 shown although any greater or lesser number of panels may be used. The meeting edges of adjoining panels are hinged together by end hinges 45 and intermediate hinges 46. All of the panels may be solid, or the upper panel may have window lights therein. Projecting from the sides of the panels are guide rollers 47 which travel in the guide tracks at the sides of the doorway. There may be any desired number of these rollers for the door, but in the preferred arrangement said rollers are provided at the bottom edge of the lower panel, and in proximity to the hinge axes of the several panels, and a pair of rollers 47a are mounted adjacent to the upper edge of the top panel 44 for controlling this top panel. In such arrangement the intermediate pairs of guide rollers are preferably mounted on the hinge pins of the outer hinges 45, as I shall presently describe.

The guide tracks or rails in which these rollers travel are generally indicated at 51; and comprise the substantially vertical portions 52 extending more or less parallel to the doorway 36 or jambs 37, the curved portions 53 which curve rearwardly back into the garage from the upper ends of the vertical portions 52, and the approximately horizontal or overhead portions 54 which extend rearwardly in continuation of the curved portions 53. One of these track units or assemblies is disposed at each side of the doorway, with the vertical portion 52 secured to the jamb or frame in a manner to be hereinafter described and with the horizontal portion secured to the bracing beams 40 or other frame portion of the garage as by the hanger bracket 55 or the like.

In garage structures where the overhead clearance is comparatively small by reason of the roof or ceiling being in close proximity to the top cross member 38 of the doorway, or by reason of the cross braces 40 being comparatively low, it is usually necessary to have the curved portions 53 of the tracks start their rearward curvature below the top cross member 38 so as to dispose the horizontal track portions 54 within the limited overhead clearance. In other garage structures where there is ample overhead clearance, enabling the horizontal track portions 54 to be disposed at a higher level, the curved portions 53 need not start their rearward curvature at a point below the top of the doorway. In the former instance where the overhead clearance is limited it is usually necessary to provide a different arrangement of apparatus for causing the top panel 44 to move into closed position against the cross rail 38 and upper portions of the jambs, as I shall hereinafter describe.

*Counterbalancing mechanism*

In Figures 3, 4, and 5 I have illustrated in detail one form of improved counterbalancing mechanism which is disposed above the doorway and extends generally parallel thereto. Two flexible members 58 in the form of cables or chains are fastened at their lower ends to the lower corners of the bottom panel 41 and extend upwardly to sheave blocks or guides 59 mounted above the doorway. The guide rollers 47 and 47a are mounted on pins 57 projecting from the side edges of the door, and the vertical stretches of the cables 58 pass, from their lower points of attachment on the door to the overhead sheave blocks 59, along the outer sides of the pins 57, that is, the cables are disposed between the outer sides of the pins 57 and the outer side of the door. By so disposing the cables they may be arranged in planes between the side edges of the door and the guide tracks, which is the preferred relation, without interfering with the movement of the guide rollers and pins back along the overhead portions of the tracks. It will be understood that, if desired, the vertical stretches of the cables may be disposed outside the planes of the guide tracks. Each cable passes inwardly over the top of the sheave block 59 to a sheave block 61 around which it is reeved. Connecting straps or clevis members 62 are mounted on the pivot axles 63 of the two sheaves 61, and extend towards each other for attachment to the opposite ends of spring means 64. This spring means may consist of a single tension spring, or where wider, heavier doors require more counterbalancing energy, two or more springs may be arranged in parallel. In Figure 1 I have shown three springs 64 in parallel relation with their opposite ends secured to evener bars 62'. These evener bars may be pivotally connected to the clevis members 62 for evenly distributing the tension between the two or more springs, or these bars 62' may be rigid with the clevis members 62. In Figure 3 I have shown two tension springs 64 and 64', one within the other, there being sufficient space between the springs so that the convolutions of one spring will not interfere with those of the other. The opposite ends of both springs are connected to the clevis members 62—62. The arrangement of one spring within the other is advantageous where it is desired that the entire counterbalancing mechanism have a minimum vertical dimension. The tension of the spring means 64 is so proportioned to the mechanical advantage of the sheave blocks 59 and 61 as to substantially counterbalance the weight of the door in each of its different positions in the travel between open and closed positions. To utilize a spring or springs no longer than the width of the doorway and to avoid too large a deflection of the spring I compound the cables and sheaves by reeving the cables around successive pulleys in each sheave block. Referring to Figures 4 and 5, I have shown the block 59 as comprising three pulleys 59a but it will be evident that a greater or lesser number of pulleys may be employed. Likewise, the sheave blocks 61 may comprise two or more pulleys 61a, the cable in each instance being looped around successive pulleys and fastened at one end to either of the sheave blocks. Each sheave block 59 is preferably pivotally mounted for swiveling on a horizontal axis. As shown in Figures 4 and 5, the pulleys 59a are mounted between the arms of a yoke 66, the transverse portion of which is secured to or constitutes a part of a bracket member 67. This bracket member has a hole therein through which a mounting bolt 68 extends, said bolt being supported in a plate 69 constituting a part of the installed unit, or being secured to any other stationary member above the doorway. The bracket 67 is arranged to swing inwardly or outwardly around the horizontal axis of the bolt 68, and to insure freedom in this swinging movement ball bearings 71 may be interposed between race grooves in the bracket 67 and race collars 72 mounted on the bolt 68. The swiveled mounting of each sheave block 59 enables the block to align itself with the line of pull acting down through the cable to the lower corner of the door. Referring to Figure 5, it will be seen that one of the pulley wheels 59a—in this instance the outer wheel—is aligned vertically with the swiveling axis of the block. The vertical stretch of the cable extending up from the door passes over this outer wheel and inwardly to the corresponding wheel of the inner sheave block 61. Hence the pull on this portion of the cable is always aligned with the swiveling axis of the outer sheave block 59. Each yoke 66 carries a downwardly disposed U-shaped fork or guide 73 between the sides of which the cable passes in running on the sheave block 59. Lateral deflection of the cable presses against one side or the other of the fork 73 and compels the sheave block 59 to swing correspondingly. Thus, as the door travels up to its overhead position and the lower edge of the door swings inwardly to some extent along the curved portions 53 of the tracks the sheaves 59 can swivel to align themselves with this slightly different angle of pull of the cables so that there is no possibility of the cables running off the sheaves or binding thereon. Such also enables a latitude of positioning of the sheaves in the installation to be obtained since they can be located at more inwardly or outwardly disposed points without disturbing the proper running of the cables.

It is particularly noteworthy that this counterbalancing arrangement automatically equalizes the counterbalancing forces transmitted to opposite sides of the door. This naturally follows from the fact that the opposite ends of the same spring transmit lifting forces to the opposite sides of the door and hence the forces are always necessarily the same so that there is never any tendency for the door to bind or drag because of unequalized counterbalancing. As the door travels up to its overhead position the diminishing tension of the spring, in proportion to the compounding of the cables around the sheaves 59 and 61, is such that automatic compensation is made in direct proportion to the decreasing weight of the door pulling downwardly on the cables. Adjustments of the counterbalancing tension may be made at any desired point in the system, although I preferably effect these adjustments at the upper dead ends of the cables, the latter preferably being connected to an extension arm 66a projecting from the yoke 66 of each sheave block 59, any suitable adjustment being provided between the end of the cable and such arm. Obviously, an adjustment at one point is equalized between both sides of the door. For doors of comparatively wide span and considerable weight I may employ chains instead of cables, and effect adjustment by hooking different links at the ends of the chains over hooks or pins on the extension arms 66a.

It will be observed that by extending the counterbalancing mechanism across and directly above the doorway a minimum overhead clearance is required and there are no difficulties in having the spring means and sheaves clear cross braces in the garage; also, there are no fixed points of anchorage required other than those for the bolts 68 directly at the sides of the curved track portions 53. This greatly simplifies installation. In some installations it is possible to install this counter-balancing mechanism in the approximately triangular space 75 (Figure 28) defined on the outer sides of the curved track portions 53 between the planes of the vertical and horizontal track portions, and in such installations no part of the entire assembly then extends above the plane assumed by the door when in its open position on the horizontal track portions 54. Where more than one spring is desirable, the use of a spring within a spring, as shown in Figure 3, enables the vertical dimension of the counterbalancing mechanism to be reduced, where this is a factor in installation.

Figures 6 and 7 illustrate this same type of counter-balancing mechanism mounted on and moving with the door. In this arrangement, the cables 58 are secured at their upper ends to brackets 76 or other fixed points of attachment adjacent to the upper portions of the guide tracks and extend down along the edges or inner side of the door to a similar compounding arrangement of multiple sheaves 59 and 61 which are mounted on the inner side of the door adjacent to the lower edge thereof. The multiple group of outer sheaves 59 is mounted in a bracket 77 which is suitably secured to the door. An arm 78 extending from this bracket, or a separate bracket arm, supports a guide pulley 79 at a point spaced out from the side edge of the door so that the vertical stretch of the cable in passing around this pulley will be disposed outside the plane of the guide track at each side of the door. The pulley 79 is mounted for swiveling movement on a horizontal swiveling axis 81 which is substantially aligned with the horizontal run of the cable passing inwardly to the multiple sheave blocks. Thus the pulley 79 can swivel to agree with the different angles of the vertical stretch of the cable as the door moves between open and closed positions, without tending to cause the cable to run off the multiple sheaves 59—61. The cable is reeved around successive wheels of these multiple sheaves in substantially the manner described in the preceding embodiment, and is dead-ended to one of the sheave blocks or to the bracket 77. The same construction and arrangement is duplicated at the opposite edge of the door. The spring means 64 connected to the two inner movable sheave blocks 61 may be a single spring, or a group of parallel springs as shown in Figure 1, or a spring within a spring as shown in Figure 3. This embodiment has the same equalizing action as the preceding embodiment, and it will be particularly noted that by mounting the counterbalancing mechanism on the door no overhead space whatever is necessary for this mechanism. As above described, the vertical stretches of the cables 58 are preferably disposed outside of the substantially vertical planes of the guide tracks 51 where they will not interfere with the movement of the guide rollers 47 back along the overhead portions of the tracks, although, if desired, by locating the fixed points of attachment 76 for the upper ends of the cables below the upper portions of the tracks, or within the curved portions thereof, the vertical stretches of the cables may be disposed inside of or between the vertical planes of the tracks.

In Figures 8 to 16, inclusive, I have illustrated another embodiment of counterbalancing mechanism which is mounted on and moves with the door. In this form the cables 58 are wound upon sheaves or winding drums 85 which rotate about an axis extending substantially parallel to the door. Both winding drums 85 are mounted on the end portions of a sleeve 86 extending beyond the side edges of the door. Collars 87 are mounted on the ends of the sleeve 86, beyond the winding drums 85, and rotating on these collars are guide rollers 47, an anti-friction ball bearing 88 being interposed between the sleeve 87 and guide roller 47, if desired. The rollers 47 travel in the guide tracks, as previously described. The sleeve 86 is rotatably mounted in a housing structure 89 carried by the door. Bearing support for the sleeve is afforded by two outer bearing blocks 91 and two intermediate bearing blocks 92, all secured to the housing structure 89 by set screws 93. The sleeve may have plain bearings in these blocks, although I preferably dispose anti-friction roller bearings 94 in a recess in each block for rotatably supporting the sleeve 86. The counterbalancing tension is established by two coiled torsion springs 95 encircling opposite end portions of the sleeve 86 within the housing 89. The inner end of each spring is fixedly anchored to a notched out portion of each intermediate bearing block 92, as indicated at 96, and the outer end of each spring is suitably secured to a collar 97 which is secured to the sleeve by pins or set screws 98. Thus, the torisional energy stored in these two springs tends constantly to rotate the winding drums 85 through the sleeve 86. As shown in Figures 8 and 9, the cables 58 have their lower ends anchored to the drums 85 and wind thereon in the upward movement of the door, from which it will be seen that the spring energy transmitted to the drums functions to counterbalance the door. These figures illustrate each cable 58 as taking off its winding drum at the inner side thereof, and in such arrangement the cables extend up into curved supports 101 following the curved portions 53 of the tracks around the inner sides thereof, the cables thence extending rearwardly below the horizontal track portions 54 and being suitably fixedly anchored at points adjacent to the rear ends of these horizontal track portions. Each curved support starts approximately at the lower end of the curved track portion 53 and terminates adjacent to the upper end of said curved portion, serving merely to support the cable in an arc generally concentric to the curved portion of the track, although these supporting members 101 may be extended further if desired. As shown in Figure 9 they preferably consist of plates secured to the outer sides of the guide tracks and having inwardly extending flange portions 102 having upwardly turned lips at their inner extremities to form a trough for supporting the cable. The flanges 102 are spaced sufficiently inwardly from the curved track portions 53 to permit the winding drums 85 to travel along the outer curved surfaces of said flanges. It will be seen that such arrangement disposes each cable parallel to the vertical, curved, and horizontal portions of each track in inwardly and downwardly spaced relation thereto. In this embodiment of my invention the axis of the winding drums 85 may be disposed at any elevated point along the height of the door because the horizontal stretch of each cable can be extended back to any desired point under the overhead portions of the guide tracks. Manifestly, such embodiment requires no overhead clearance whatever for the counterbalancing mechanism. In Figure 17, I have illustrated another form in which the cable 58 takes off the front side of each winding drum 85 and has its upper end anchored at 105 substantially directly above the vertical portion of the track. Each winding drum may be disposed between the edge of the door and the adjacent guide tracks (in the general relation shown in Figure 10) with the upward stretch of the cable disposed on the outer sides of the roller pins 57 where the cable will not interfere with the movement of the rollers back along the overhead portion of the tracks; or the winding drums 85 may be spaced outwardly in planes beyond the planes of the guide tracks. When having the cables take off the front sides of the winding sheaves 85 it is desirable that the axis of these sheaves be disposed in close proximity to the bottom edge of the door so that counterbalancing tension will be effective up to the fully open position of the door.

In each of the latter embodiments where torsion spring means transmits winding rotation to sheaves or drums rotating about an axis extending parallel with the door I may combine automatic and manually actuated locking mechanism with the rotating member 86 on which the sheaves or drums are mounted. Referring to Figures 10, 11, 12, 13, etc., it will be seen that two duplicate shafts 107 are arranged for endwise reciprocation in the bore of the sleeve 86. The ends of these shafts or rods are adapted to be projected outwardly beyond the ends of the sleeve 86 for effecting locking engagement with the opposite tracks 51. To this end, the outer web portions of both vertical track sections are provided with holes 108 adapted to receive the projected ends of the locking shafts, one of these holes being provided in each track at a point to receive the associated shaft when the door is in its completely closed position, and further holes being provided at successively higher points for receiving the shafts for automatically arresting descent of the door in the event that the cable or spring means should break, as I shall presently describe. The manual projection or retraction of the locking shafts or bolts 107 from the lower holes 108 is effected by the rotation of a locking handle 109 projecting from the front of the door. This handle is mounted on a shaft extending into the casing 89 and having secured thereto oppositely facing cams 111, 111 disposed between the front wall of the casing and the sleeve 86, substantially as shown in Figure 11. When the handle is rotated in one direction these cams exert spreading pressure against two collars 112, 112 for forcing them in outward directions along the sleeve 86. These collars carry transverse pins 113 which extend inwardly through longitudinal slots 114 in the sleeve 86 and which pass through or engage in the adjacent end of the companion locking bolt 107. Thus, the outward separating movement of the two collars 112 transmits outward projecting movement to the two locking bolts. Light compression springs 115 are confined between the collars 112 and the adjacent bearing blocks 92 for normally tending to shift the collars and the locking bolts inwardly towards each other, so that when the manual locking handle 109 is rotated in the other direction these springs will withdraw the locking bolts from the lower holes 108 in the tracks.

Referring now to the automatic safety mechanism, each winding drum 85 is mounted so that it can have a limited amount of rotation relative to the sleeve 86, as determined by a pin 117 which is secured in the adjacent locking bolt 107 and which extends out through a longitudinal elongated slot 118 in the sleeve 86 and engages in a triangularly shaped opening 119 in the hub 121 of the winding drum 85 (see Figures 13 and 14). When the locking bolt is retracted to releasing position the pin 117 lies at the inner end of the slot 118 and at the inner narrow end of the triangular opening 119, and when the locking bolt is projected outwardly to locking position this pin is at the opposite ends of both openings. One side of the triangular opening 119 is formed with an inclined cam surface 119' which, in the event of relative rotational movement towards the pin 117, functions to cam the pin in an outward direction for projecting the bolt to its outward locking position. Referring to Figures 12 and 13, at another point around on the hub 121 there is formed an arcuate slot 123 from which projects a pin 124 to which one end of a tension spring 125 is connected, the other end of this spring being anchored to the web of the winding drum. The inner end of the pin 124 is anchored to the sleeve 86 and, if desired, a segment block 126, of shorter angular length than the slot 123, may be secured in the slot by the pin 124 passing therethrough and being secured to the sleeve 86. This pin and segment block hold the sheave 85 against shifting along the sleeve but permit the sheave to rotate to a limited extent relatively to the sleeve. In the normal condition of the parts the counterbalancing tension of the springs 95 tends to rotate the sleeve 86 in a clockwise direction as viewed in Figure 13 and this tension, preponderating over the tension of the spring 125, holds the pin 124 or segment 126 against the right hand end of the slot 123, at which time the pin 117 is at the inner ends of the two openings 118 and 119. If either cable 58 should accidentally break or become unfastened from its upper point of anchorage there is no reaction pull tending to hold the sheave in such relation to the sleeve, and hence the spring 125 immediately snaps the sheave around in a clockwise direction (as viewed in Figure 13) with the result that the cam surface 119' revolves toward the pin 117. This forces said pin outwardly and projects the associated locking bolt 107 outwardly into one of the holes 108 in the track so that the door is instantly locked against descent. The tension of the spring 125 tending to cam the locking bolt in an outward direction is sufficient to overcome the light compression of the spring 115 at the inner end of the locking bolt. If, on the other hand, the springs 95 should break or become accidentally released the tension spring 125 is thereby enabled to instantly revolve the sleeve 86 in a counterclockwise direction relatively to the sheave (Figure 13) with the result that the cam surface 119' and the pin 117 have this same relative movement for forcing the locking bolt outwardly into one of the holes 108 to lock the door against accidental descent. Thus, the mechanism safeguards the device against breaking or releasing of the cables or of the counterbalancing spring means, so that under no circumstance can the door accidentally fall upon a person or car. It will be understood that both winding drums or sheaves 85 have this same cam and pin connection with their associated locking bolts 107. The counterbalancing tension may be adjusted by rotating one of the drums 85 in one direction or the other before the ends of the cables are fastened thereto. To facilitate performing this operation, a series of apertured bosses 128 (Figure 15) project inwardly from each winding drum, to one side of the channel portion thereof, for receiving a tool inserted from the outer side of the drum and by which the necessary leverage can be exerted for rotating the drum before the cables are attached thereto.

This automatic safety locking mechanism may be incorporated in embodiments where the cables take off the front sides of the drums 85, as shown in Figure 17. In such adaptations the relations of the springs would be reversed for the opposite direction of winding rotation of the drums, and the locking holes 108 in the tracks would preferably be extended down to lower points because in those embodiments it is desirable to dispose the winding drums adjacent to the lower edge of the door.

The automatic safety locking mechanism may be employed independently of the manually actuated locking handle 109, but where the latter is also incorporated in the structure it is advantageous to be able to dispose the mechanism housing 89 slightly higher on the door to facilitate establishing an operative connection between the handle 109 and the locking bolts 107 and to dispose the handle in a convenient position. The present mechanism has this capability of being mounted at any desired height on the door, and as illustrative thereof I have, in Figures 10 and 11, shown the mechanism built into the door approximately at the meeting line between the bottom panel 41 and the second panel 42. In this instance the housing 89 is of rectangular box-like form to form the upper portion of the lower panel, and the line of hinge connections between the two panels is formed along the inner or rear wall of this housing, this hinge axis being indicated at 45 in Figure 11. The hinges comprise a series of spaced lower plates 131 (Figure 16) rigidly secured to the lower panel 41 and a series of upper plates 132 rigidly secured to the second panel 42, these plates extending across the inner side of the spring housing 89 and having their meeting edges curled to form the hinge eyes for receiving the hinge pins. Screws 134 pass through the lower plates 131 directly below the hinge axis and thread into the bearing blocks 91 and 92 for securing the plates 131 to the spring housing and bearing blocks. Holes 135 in the lower end plates 131 afford access through the spring housing 89 to the set screws 98 in the spring collars 97, whereby these collars can be released for withdrawing the assembly from the end of the housing when it is desired to replace springs or repair any of the parts. When the two panels 41 and 42 fold relatively to each other in passing around the curved portions of the track the lower edge of the second panel 42 swings upwardly away from the top of the housing 89.

Key controlled locking means may be provided for holding the locking bolts 107, 107 in their manually projected locking positions for holding the door closed. Such key controlled means may be associated directly with the handle 109 for preventing rotation of the handle, but in the preferred embodiment shown I employ a wedge or spacing member 138 which, when the collars 112 are spread apart for locking the door, is adapted to move down into the space between said collars whereby to hold them in their separated relation. As shown in Figure 11, this locking spacer extends down along the inner side of the second panel 42 and has its end bent inwardly into the spring housing through slots 139. When the spacer member is in its normal elevated position it clears the two collars 112, but when the spacing member is projected downwardly it moves between the two collars and holds them in separated door locking positions. The top wall of the spring housing 89 is notched out directly above the inwardly bent end of the spacing member 138, as indicated at 141, so that this end of the spacing member can swing upwardly through said slot when the two panels are folded relatively to each other. The spacer member extends upwardly to any suitable type of key controlled lock 143 comprising a member which can be released by the insertion of a key in the lock from the outside of the door and which latter member then functions to raise or lower the spacing member 138. A knob 144 on the inner side of the lock enables the spacing member to be lifted without the use of a key. The door is lifted from the inner side through a handle 145 constructed in the form of a rolled bead in the inwardly projecting portion of a plate 146 which is secured to the door, this plate having a slot 147 in back of the bead 145 for receiving the fingers.

Figures 12 and 14 illustrate a typical cross section of guide track which I preferably employ. The guide rollers 47 preferably have rounded peripheries and the inner side of the track is formed with a correspondingly curved wall 151 which embraces the roller and holds it against sidewise shifting. The outer side of the track 51 is formed with a straight flange wall 151'. In certain embodiments of my invention the vertical sections of the tracks are arranged for vertical shifting movement (for a purpose which I shall hereinafter describe) and in other embodiments these vertical track sections are stationary. In the latter embodiments said track sections may be secured at spaced intervals by angle brackets 153 which are secured to the outer sides or web portions 151" of the track and which are also secured to the inner sides of the jambs 37.

In the embodiments of my invention illustrated in Figures 8–16 and 17, I may dispense with the use of the cables 58 and employ a rack and pinion combination in lieu thereof. For example, as shown in Figures 18 and 19, the winding drums 85 may be substituted by spur pinions 156 which are held in mesh with racks 157. These racks would extend along the guide tracks through the operative range of travel of the pinions which, with the pinions mounted adjacent to the lower edge of the door, would be from the lower portions of the tracks up to and possibly around a small part of the curved track portions 53. The racks 157 may be arranged as separate elements disposed between the edges of the door and the guide tracks, with the guide rollers 47 serving to hold the pinions 156 in mesh with these racks, but preferably the racks would be secured along the inner edge portions of the guide tracks, as shown in Figure 19, where the racks would take the place of the inner lips of the curved flanges 151, for holding the guide rollers 47 against inward displacement from the tracks. The pinions 156 would have the same mounting on the sleeve 86 as the winding drums 85 in Figure 10. With the racks carried by the tracks or separated therefrom, in either case the rack teeth would preferably face outwardly as shown in Figure 18 so that the weight of the door would assist in holding the pinions in mesh with the curved portions of the racks. Also, in either case the same general arrangement of manual and automatic safety locking mechanism illustrated in Figure 10 may be employed to safeguard the construction against the possibility of breakage or releasing of the counterbalancing springs 95.

*Top panel controlling mechanism*

As I have previously remarked, in garage installations having a limited overhead clearance where the curved portions 53 of the tracks start their rearward curvature at a point considerably below the top of the doorway, it is usually necessary to provide some means for causing the top panel, such as 44, to swing up to a fully closed position against the top of the doorway and against the upper portions of the jambs. In Figures 20 and 21, I have shown the details of a track construction for closing the top panel, the general principles of this improved top panel controlling mechanism being also illustrated in the embodiments of Figures 1–3, 17, 18, and 28. In such arrangement the top guide rollers 47a, mounted adjacent to the upper edge of the top panel, are spaced outwardly beyond the vertical planes of the lower rollers 47 in order to move through separate guide tracks which control the top panel. In this embodiment the horizontal track portions 54 are made of double width, as shown in Figures 3 and 20, the lower rollers 47 traveling along the inner portions of the tracks and the two upper rollers 47a on the top panel traveling along the outer portions 54a of the tracks. A small upturned rib or bead 161 preferably extends lengthwise of each horizontal track portion to define separate track ways for the inner and outer rollers. Switching off from the curved portion of each track is a deflecting track section 162 which is formed as a continuation of the outer track way 54a, extending in the same plane thereof. The top or outer flat flange 151' of the inner track way extends down across the open inner face of the deflecting track section, but substantially midway of the height of the latter section this flange is notched out as indicated at 163 to permit the supporting pin 57a of the upper roller 47a to pass therethrough. Each deflecting track section 162 slopes downwardly toward the doorway at a sufficient angle so that when the door is moving downwardly and approaching its closed position the bottom wall or flange of this track will exert a camming pressure against the associated roller 47a for forcing the top of the upper panel 44 into tightly closed engagement against the lintel 38 and against the upper portions of the side jambs 37. Also, this inclination of the deflecting track section results in the upper or outer flange thereof exerting a rearward camming pressure against the associated guide roller 47a for forcing the top of the panel inwardly away from the doorway when the door is started in its upward movement. Each deflecting track section 162 may be curved length of the same stock making up the vertical track sections 52, having substantially the same relation of inner or under curved flange 151, outer or upper flat flange 151', and web 151". The preferred manner of joining each deflecting track section to the horizontal track section is to weld the vertical web portions of the two sections together, and to weld the curved and flat flange portions of the two sections together with these flange portions joining on gradual curves as shown in Figures 20 and 21. In such relation, the curved flange 151 of the deflecting track section will merge into the dividing rib 161 so that the trackway 54a will be a continuation of the trackway in the deflecting or switch-off track section 162. The web portion 151" of the curved track section 53 will terminate substantially at its juncture with the curved flange portion 151 of the deflecting track section.

The joining plate 69 may be bolted, riveted or welded to the horizontal and curved track sections. In shipping the hardware the horizontal sections 54, curved sections 53, deflecting sections 162 and joining plate 69 all constitute one unit, and the vertical sections 52 constitute a separate unit. In erecting the tracks each vertical track section 52 is bolted to the lower edge of the joining plate 69 (or to the lower edge of the curved track section), except in those embodiments where these vertical track sections are shiftable for securing the weather-tight closure between the door and jambs, as I shall presently describe. Thus, these track portions can be readily installed without any difficulties in securing proper registration of trackways and without the possibility of later disalignment of the track portions. In the above described form of top panel controlling mechanism all of the guide rollers 47 and 47a are in the same approximately vertical plane when the door is closed, and, when the door is moved to its open position, all of the rollers move rearwardly in the same approximately horizontal plane and all of the panels lie in the same plane when the door is overhead.

In Figures 8–9 and 22–23, I have illustrated a modified construction of panel controlling mechanism comprising angularly bent levers 172 disposed at each side of the upper panel 44. These levers are pivotally mounted intermediate their ends on studs 173 projecting outwardly from angularly shaped clips or brackets 174 which are secured to the edges of the panel. The inner arm of each lever 172 pivotally supports a roller 175 which is adapted to travel in the same guide tracks as the lower guide rollers 47. The other arm of each lever has two laterally projecting lugs 177 and 178 formed thereon and defining a channel or fork opening 179 therebetween. Stationarily mounted adjacent to each side of the doorway and above the curved portions 53 of the tracks are cams or guide members 181 in the form of laterally projecting flanges adapted to be embraced by the forked ends of the levers 172. These cam flanges may be constructed as lateral projections extending from bracket arms rigidly secured to the frame or track structure; or, where a corner joining plate 69 is employed to connect the vertical, curved and horizontal portions of the track together, this cam flange may consist of a portion of metal punched from the body of each joining plate and bent inwardly into position to be engaged by the forked end of the lever. As shown in Figure 22, the roller supporting end of the lever has a stud or shoulder 184 projecting inwardly therefrom into position to have the top panel drop thereon and be carried thereby as the door moves back to its overhead position. As the door is initially lifted from its closed position the engagement of the forked end of the lever with the cam 181 causes the lever to be rotated slightly around its forked end, and such movement, together with the inward deflection of the roller 175 upwardly along the inwardly curved portion of the track, results in the top panel being swung inwardly. After the forked end of the lever has moved out of engagement with the cam 181, with the continued upward movement of the door the top panel drops upon and is carried by the studs 184 during the remaining opening movement of the door. If desired, instead of carrying the top panel on these inwardly extending studs, the laterally projecting lug 178 at the other end of the lever may be made sufficiently long to ride on the top flange of the overhead track portion so that the panel is carried at the pivot studs 173 which are then in suspended relation between the outer end of each lever bearing on the top of the track and the inner end of each lever bearing through the roller 175 on the inner side of the track. When the door is moved in the opposite direction towards closed position the upwardly inclined surface on the upper lug 177 of each lever engages the top edge of the cam flange 181 as the door approaches its closed position, and during further movement each lever 172 is rocked in a clockwise direction around the pivot axis 173 which causes the rollers 175 to swing downwardly relatively to the upper panel and thereby cam the upper panel forwardly against the top of the doorway for insuring a tight closure of the upper panel.

Figure 24 illustrates another form of top panel controlling mechanism. At each side of the top panel an arm 185 is rigidly secured to said panel and projects inwardly or rearwardly therefrom. The inner end of each arm is forked to provide the relatively long projecting finger 186 and the relatively short projecting finger 187 which are adapted to cooperate with a stationary pin or lug 188 projecting laterally from the inner side of the curved track portion, the projection 188 constituting part of a bracket or clip member 189 which is secured to the track. Said arm 185 projects rearwardly from the panel at a point adjacent to the hinge axis between the top panel and the adjoining panel. To insure a staunch connection of the arm with the panel the arm is shown as being provided with an angular extension 185' which extends up along the side edge of the panel and is secured thereto at the vertically spaced points 191 and 192. The point of attachment 192 may be the pivot stud upon which is mounted the guide roller 47 which is disposed adjacent to the hinge axis or meeting line of the two upper panels. The top rollers 47a for the upper panel are adapted to roll along on the top side of the overhead track portion, and each joining plate 69 may be provided with a track surface 194 along which the upper roller moves as the top panel swings to closed position. When the door is moved upwardly from the position shown, the finger 187 is caused to press against the stop projection 188, thereby transmitting a rotative force to the top panel and causing the upper edge of said panel to swing rearwardly. As the panel swings in this direction the finger 187 is retracted to a point where it clears the stop projection 188 and thereupon the door moves to its overhead position with the rollers 47a riding along on the upper surfaces of the top track portions. When the door is moved towards its closed position the bottom finger 187, because of its retracted position, clears the stop projection 188, but the longer upper finger 186 engages this projection and thereupon rotative force is transmitted to the top panel tending to swing the upper edge thereof forwardly. As the door is brought down to its completely closed position the top panel is thereby swung forwardly into close fitting engagement with the top of the doorway.

*Mechanism for obtaining weather-tight closure between door and doorway*

As I have previously remarked, when the door is being moved downwardly towards its closed position or upwardly towards its open position, its travel in the substantially vertical portions 52 of the tracks should be unhindered by any appreciable frictional engagement with the jambs or other portions of the doorway, otherwise it will be difficult to open and close the door and the action of the counterbalancing means may be irregular. On the other hand, when the door is in its closed position it is desirable that a substantially weather-tight joint be established between the sides of the door and the doorway to exclude snow, rain and cold, and to prevent rattling of the door by the wind. In Figures 8, 9, 25, 26, and 27 I have shown weather-sealing means in the form of movable jamb members which effectively exclude the weather but do not hinder the normal travel of the door. As shown in Figure 25, the side jambs 37 are provided with jamb extensions 195 which project inwardly from the frame of the doorway along each jamb rail. Mounted on each of these jamb extensions 195 is a sealing member in the form of a vertically movable jamb plate 196 extending substantially the entire height of the doorway. These jamb plates are of angle cross section, comprising a flange 197 extending parallel to the door and adapted to contact with the outer face of the door, and a flange 198 extending substantially at right angles to the plane of the door and adapted to have slidable mounting support on the outer side of each jamb extension 195. For mounting said jamb plates the flanges 198 thereof are provided at vertically spaced intervals with inclined guide slots 199. Screws or bolts 201 pass through these inclined slots and are secured in the jamb extensions 195, these screws or bolts being disposed in vertical alignment on the member 195 and having their heads engaging the flange 198 with a snug but sliding fit so that the jamb member 196 can slide relatively to the jamb extension 195. A tension spring 202 (Figure 8) is connected to the upper end of each jamb plate 196 and has its upper end anchored to the frame of the garage above the doorway. These springs normally tend to slide the jamb plates upwardly, and it will be apparent that in such upward sliding movement said plates will be shifted outwardly away from the outer face of the door by virtue of the inclined slots 199 traveling along the fastening members 201. Extending inwardly from the lower end of each jamb plate is a foot projection 203 which is adapted to be engaged by any suitable projection or part mounted on the lower portion of the door, such as by the pivot supports 57 for the bottom guide rollers 47. Each foot projection 203 is preferably made in the form of a separate plate or bracket 204 which is secured to the base end of the jamb plate, a laterally offset bend 205 being formed between the foot extension 203 and the mounting portion 204 so as to permit the adjacent lower corner of the door to move down into the space between the foot projections 203 of opposite jamb plates.

It will be evident from the foregoing that when the door is in an elevated position the jamb plates 196 are also held in an elevated position by the tension of the springs 202, at which time the jamb plates have been carried forwardly by the inclined slots 199 so that the sealing flanges 197 are out of engagement with the front face of the door. Hence, the door can move freely unhindered by any frictional resistance by the jamb plates. In the movement of the door towards its closed position, the last part of the movement brings the bottom roller supports 57 into engagement with the foot extensions 203 and causes the jamb plates to be carried downwardly with the door. During such movement the jamb plates are carried inwardly to bring their flanges 197 into tight engagement with the outer face of the door so that when the door is closed a weather seal is established between the door and the sides of the doorway. When the upward movement of the door is started the jamb plates 196 move concurrently therewith by virtue of the combined action of the tension springs 202 and the frictional engagement of the jamb plates against the face of the door. In such upward movement the jamb plates are quickly carried forwardly out of contact with the face of the door, and during the remaining part of its upward movement the door remains out of contact with the jamb plates.

In Figures 3, 28, 29, 30, etc. I have illustrated a modified arrangement wherein the substantially vertical track portions 52 are movable for carrying the door into and out of sealing engagement with the doorway. In this form the vertical track portions 52 separate from the curved track portions 53 at 208 and each vertical track section is slidably mounted on a plurality of brackets 209 which project inwardly from each jamb structure 37. In the preferred embodiment a cooperating arrangement of pins and diagonal slots is provided between the series of brackets and each vertical rail, with the slots formed in the brackets and the pins carried by the track rail, or vice versa. In the construction shown I form the slots 211 in the brackets 209, and secure the pins or studs 212 to the track. A tension spring 213 connected between the upper portion of the vertical track and the lower portion of the curved track tends to lift the track section, and any suitable projection 215 at the lower end of the track is adapted to be engaged by the lower guide rollers 47 for forcing the track downwardly. The inclination and arrangement of the diagonal slots 211 is such that when each vertical track portion is raised to the upper limit of its movement its upper end registers accurately with the lower end of the curved portions 53, at which time the track section is in a rearwardly shifted position, moved away from the side jambs; and when the track is at its lower limit of movement it is in a forwardly shifted position, closer to the side jambs. It will be understood that substantially this same motion of the track sections may be had by using swinging links instead of the above pin and slot arrangement. There would be two or more links for each track section and each link would have one end pivoted to a bracket 209 or other stationary part of the doorway and its other end pivoted to the track section. I consider such link mounting to come within the broader aspects of my invention but the pin and slot construction is cheaper to manufacture.

In the operation of this embodiment, when the door is moving down from its overhead position the vertical track portions 52 are elevated with their upper ends in registry with the curved track portions and retracted rearwardly in a direction away from the jambs so that the door is free to move downwardly without frictional contact with the jambs. Adjacent to the bottom of the closing movement, however, the bottom guide rollers 47 engage the projections 215, or with closed ends at the bottoms of the tracks, and carry the tracks downwardly with the door, with the result that the track sections are shifted forwardly and in consequence bring the door forwardly into sealing engagement with the jambs. The guide rollers 47 between the two uppermost panels are at this time engaging in the shifted lower track sections so that the lower edge of the upper panel is also carried forwardly into engagement with the jambs, and, since the top edge of the upper panel is carried forwardly into sealing engagement with the doorway by the top panel controlling mechanism, it will be evident that all of the panels of the door are closed around the entire perimeter of the doorway. In the initial opening movement of the door the lower track sections are caused to move upwardly concurrently with the door by the combined force of the springs 213 and the action of the guide rollers in these track sections, whereby the door is instantly carried rearwardly out of contact with the jambs so that it can move freely to overhead position.

In Figures 29, 30, and 31 I have illustrated an improved construction of detent mechanism devised to cooperate with the above described construction of shiftable track sections, and having the two-fold utility of causing the shiftable track sections to be lifted positively with the door in the initial opening movement, and of locking the track sections in their elevated positions until the door is again returned to closed position. Adjacent to the lower end of each shiftable track section, the outer flat flange 151' is provided with a relatively long slot 221. Mounted on the outer side of said flange, over this slot, is a bracket 222 of channel shape having forwardly projecting, spaced side flanges 223 and having a web portion 224, the ends of which are riveted or welded to the flange 151', the intermediate length of this web being cut away, however, to match with the slot 221. A lifting and detent member 226 is pivotally mounted between the side flanges 223 on the transverse pivot pin 227. A forked outer end 228 of the member 226 pivotally supports a roller 229 which is adapted to cooperate with the sloping upper surface 231 of a stationary catch or abutment 232. The inner side of the swinging member 226 is provided with an inwardly projecting finger 234 which, in one position of the swinging member 226, is adapted to project into the track section in the path of the lowermost guide roller 47. Above the finger 234, the inner part of the member 226 is formed with a substantially straight surface 235 which, with the finger projecting inwardly as shown, is adapted to align substantially flush with the inner wall of the track. The upper end of the surface 235 may be provided with a slight projection 236 adapted to extend into the track. Extending through the body of the pivoted member 226 is a hole 237 in which is confined a stiff compression spring 238 which has its ends pressing outwardly against the side flanges 223 of the bracket.

When the roller 229 is engaging on the upwardly sloped surface 231 of the stop 232 the track is in its elevated position. As the door travels down toward its closed position the bottom guide roller 47 strikes the finger 234 and swings this finger outwardly through the slot 221, out of the path of the roller. The oscillation of the member 226 swings the roller 229 clear of the stop projection 232, and consequently as the bottom guide roller continues its movement down into the lower end of the track and strikes the bottom projection 215 it carries the track downwardly with it, the track also shifting forwardly in such movement to bring the door against the jambs, as previously described. With the door in its closed position, the member 226 then occupies the position indicated in dotted lines, with the surface 235 and projection 236 extending into the track above the guide roller. When opening the door the initial upward movement of the guide roller brings it against this portion of the member 226, thereby oscillating said member outwardly with continued upward movement of the guide roller, causing the detent roller 229 to press outwardly against the surface 233 of the stop 232 and tending to force the track upwardly and backwardly. When the track reaches the upper limit of its movement the roller 229 has reached a height where it can swing over and engage upon the upper surface 231 of the stop 232, thereafter holding the track elevated. When the member 226 reaches this position, illustrated in full lines, the track has been lifted to its uppermost position and at this time the guide roller 47 is free to continue its upward movement along the track. The detent action of the compression spring 238 pressing outwardly against the side walls of the channel bracket holds the pivoted member 226 in such position with the track elevated, and this holding function may be assisted by proportioning the length and inclination of the surface 231 to hold the lifting roller 229 against inward swinging movement. It will be understood that both vertical track sections at each side of the doorway are provided with duplicate lifting and detent members 226. Both track sections may also be provided with the upper tension springs 213 (Figure 26), but, by providing the members 226 reliance need not be placed upon these springs for lifting the tracks to their elevated positions and holding them in such positions because the members 226 first positively lift the track sections with the upward movement of the door and then securely hold the sections in their elevated positions until the door is again returned to closed position.

For small installations the stationary projections 232 may be mounted on brackets similar to the brackets 209 of Figure 26 and the outer side edges of the panels may contact directly with the wood jambs, but in large installations I mount each stop projection 232 on a metallic jamb member 241 (Figure 31) extending vertically along the wood jamb at each side of the doorway, and the outer side edges of the panels are preferably arranged to contact with this metallic jamb member in effecting the weather seal. Each member 241 is of angle cross section, comprising a flange 242 which is secured to the wood jamb, and an inwardly projecting flange 243. The stop projection 232 is welded or otherwise secured to the flange 242 in the corner of the angle, and the edges of the panels engage the inner surface of this flange, outside of the plane of the stop projection, when the track sections shift the panels forwardly to seal the door.

In Figures 32 and 33 I have illustrated another modified construction for securing a weathertight joint between the door and doorway. The seal is obtained by a wedge or taper coaction between contacting surfaces on the door and doorway, the contacting surfaces on the door tapering convergingly towards the bottom of the door and the contacting surfaces on the doorway also tapering convergingly towards the bottom of the doorway, the tapers on both the door and doorway lying in a plane parallel to the plane of the door. The vertical track portions, which in this instance can be made stationary, have their outer flanges 151' (the flanges adjacent to the outer side of the building) formed on a long taper, increasing in width from the top to the bottom of the vertical track portion, and bent inwardly from this outer flange is a sealing flange 244. The latter flange also extends on this same taper and it will hence be seen that the inner surfaces 244' thereof at opposite sides of the doorway define an opening therebetween which continuously diminishes in width from the top to the bottom of the doorway. Secured to the outer face of each panel, along each vertical edge thereof, is a plate 245 having a side edge or surface 245' which is tapered to correspond to the tapered surface 244' on the track portions. The resulting construction is such that both the doorway and the door have correspondingly tapered sealing surfaces lying substantially in the plane of the door, or parallel thereto, and these sealing surfaces are proportioned so that they will engage in snug fitting contact substantially at the instant that the door reaches its closed position. Prior to such contacting, and immediately after the contact is broken in the lifting of the door, the cooperating sealing surfaces are out of engagement with each other and hence do not hinder the movement of the door. In installations where the tracks start to curve rearwardly below the top of the doorway, plates or bars 246 may be extended upwardly along the wood jambs to the top of the doorway in prolongation of the tapered surfaces 244' so that the upper panel or panels will also have sealing engagement along tapered surfaces.

Figure 28 illustrates what I regard to be the preferred construction of door for installations where the overhead clearance is limited, such as would require that the curved portions 53 of the tracks start their rearward curvature at points below the top of the door opening. In this preferred construction for such installations, the counterbalancing mechanism is preferably of the type illustrated in Figures 3, 4, and 5 which counterbalancing mechanism can be contained, if necessary, substantially entirely in the triangular space 75 defined on the outer sides of the curved track portions 53 between the vertical plane of the inner sides of the door jambs and the upper horizontal plane of the top edges of the horizontal track portions 54 (or the horizontal plane of the top surfaces of the door panels when the door is in open position). This arrangement of the counterbalancing mechanism requires no more head room than is required for the door to move to open position. In this preferred embodiment the top panel controlling mechanism is preferably of the type having the switch-off track sections 162 for controlling the guide rollers 47a on the top panel, as previously described; and the jamb closure mechanism is preferably of the type illustrated in Figures 28, 29, 30, and 31 wherein the vertical track sections 52 are shifted to carry the door into and out of contact with the jambs and wherein the lifting and detent members 226 are employed for positively lifting the shiftable track sections 52 and for holding them in lifted positions.

In other installations where a greater amount of overhead clearance is available I preferably employ the construction illustrated in Figure 34. The counterbalancing mechanism is preferably of the same general type illustrated in Figures 1, 2, and 3, although any other of the previously described embodiments of counterbalancing mechanism may be employed. The jamb closure mechanism is effected by vertically shiftable track sections 52 which carry the door into and out of contact with the jambs and which are positively lifted, and held elevated, through the instrumentality of the members 226 illustrated in Figures 29 and 30. In this modified construction I employ the shifting movement of the vertical track sections 52 to carry the top edge of the upper panel into and out of closure contact with the top of the doorway. To obtain a close fitting pressure contact of this portion of the top panel against the doorway it is desirable that the upper controlling rollers 47a be mounted on this panel in close proximity to the upper edge thereof so as to be capable of exerting the necessary outer pressure against the upper portion of said panel. With these upper rollers being carried toward and away from the door jamb by the shifting of the track sections, it necessarily follows that the line of separation 208 between the shifting sections of the tracks and the stationary sections of the tracks should be above these upper rollers when the door is in closed position. In Figure 34 I have illustrated a construction in which the line of separation is above the upper rollers, and in which only a comparatively small overhead clearance is required, while still having the curved portions 53 of the tracks of sufficiently large radius to insure smooth running of the door. This is obtained by forming the upper ends of the shiftable track sections with inwardly curved portions 52', which are curved on a radius $x$ which is considerably shorter than the radius $y$ of the main curved sections 53 of the tracks. If it is attempted to move any of these overhead doors through a considerable length of curved track having a relatively small radius the motion of the door is very jerky and irregular. In the construction illustrated, it will be noted that the major portion of the curve is on the long radius $y$, which I preferably make of approximately 15 inches. Only a comparatively short length of the curve is on the small radius $x$, which can be made as small as 6 inches in the proportions shown, or approximately one-third of the radius $y$. By reason of curving the upper ends 52' of the shiftable track sections on the short radius $x$, it is possible to lower the height of the horizontal track sections 54 while still retaining the long radius $y$ for the major portion of the curve and at the same time have the top guide rollers 47a of the top panel disposed in the vertical portions of the shiftable track sections at the time of closure, so that these top rollers will be carried forwardly the proper distance to carry the top edge of the upper panel forwardly into closing engagement with the doorway. By this arrangement the axes of all of the guide rollers 47 and 47a along the entire height of the door can be placed in the same vertical plane, or parallel to the plane of the door; this is an advantage because when the door is in its overhead position all panels are parallel with the horizontal track sections, with no portion of the top panel 44 projected up above the level of the remainder of the door where it would require more clearance. The dash and dot line illustration in Figure 34 shows the relative positions of the door, the upper guide rollers 47a and the shiftable track sections, substantially at the instant that the door, or its bottom rollers, has engaged the arms 234 of the members 226 (Figure 29) and is about to carry the track sections downwardly with the door. The dotted line illustration shows the relation of these same parts when the door is completely closed, the curved upper ends 52' of the shiftable track sections having separated from the main curved track sections 53. It will be noted that in this closed position the upper guide rollers 47a are engaging in the approximately vertical lengths of the shiftable track sections, whereby they have carried the upper edge of the top panel forwardly into weather sealing contact with the top of the doorway. A bracket 69' is secured to the lower end of each curved track section 53 and is also provided with an inclined slot 211 for receiving a stud or pin 212 on the upper portion of the shiftable track section. It will be understood that the embodiment may also use the previously described arrangement of swinging links instead of the pin and slot arrangement, if desired.

*Locking mechanism—hinge and roller construction*

The locking mechanism illustrated in Figures 1 and 3 comprises two reciprocating locking bolts 247, the inner ends of which have offset rack portions 247a which mesh with opposite sides of a pinion 247b. This pinion is mounted on a shaft 248 carrying operating handles 248a on the outer and inner sides of the door. Tension springs 248b are connected between the locking bolts 247 and a housing or cover plate 248c, these springs tending to retract the locking bolts to their releasing positions. When one of the handles 248a is rotated to project the locking bolts to their locking positions they are held in these positions by a suitable key controlled latch 249 adapted to engage in a notch 249a formed in the outer edge of one of the locking bars. Said locking bolts 247 are guided for reciprocating movement in suitable guides mounted on the inner side of the door.

In installations where the vertical track sections 52 are stationary the outer ends of the locking bolts may engage directly in locking slots cut in the web portions of the tracks. In installations where the vertical track sections are shiftable for effecting the jamb closure of the door the bolts can pass entirely through the slots in the web portions of the tracks and engage stationary shoulders or slots arranged on the outer sides of the tracks. Where said track sections are carried by brackets 209 the stationary shoulders or slots may be associated with these brackets, and where the tracks are supported on the stationary, angle-shaped jamb members 241 these shoulders or slots may be associated with the latter members. In Figures 35 and 36 I have shown an adjustable type of keeper for cooperating with the ends of these locking bolts in any of the above situations. In some installations the height of the ground sill or floor at the bottom of the doorway may be higher or lower than in others, and to insure that the door will always be held locked in close fitting contact with the ground sill or floor I make each of these keepers 250 adjustable vertically with respect to its bolt receiving slot 251. In the exemplary arrangement shown I have illustrated the bolt receiving slot and keeper associated with the side flange 243 of one of the stationary jamb members 241 described in connection with Figures 29–31. Each keeper is constructed as a part of a plate 250a which is mounted for vertical shifting movement on the outer side of the flange 243. A bolt 250b is riveted to said flange and extends outwardly through an elongated slot 250c in the plate 250a, receiving a nut 250d over its threaded end on the outer side of the plate. Loosening of the nut 250d enables the plate and keeper portion 250 to be adjusted vertically so that the associated locking bolt 247 will engage snugly below the keeper 250 when the bottom edge of the door is in firm contact with the ground sill of the doorway. This construction of adjustable keeper may be associated with the brackets 209 or with the stationary track sections when these members cooperate with the locking bolts to hold the door locked in closed position.

The door may be pulled down to closed position through the operation of a pull-down rope disclosed at one or both edges of the door and on the inner side thereof. In Figure 3 this rope 252 has one end fastened to the inner side of the jamb 37 at 252a and has its other end fastened either to the inner side of the door or extended across the entire lower portion of the door and fastened to the jamb 37 at the opposite side. The intermediate portion of the rope passes through one or more pulleys 253 mounted for swinging movement on brackets 253a carried by the door adjacent to the lower edge thereof. When the door travels up to its overhead position a loop of this rope hangs down from the door at one or both sides of the doorway, and by pulling down on such loop or loops the door is pulled down to its closed position.

In Figure 37 I have illustrated an improved form of latch mechanism for holding the door in open position, which latch mechanism is released by the pull-down rope 252. Said latch mechanism comprises a latching bolt 254 arranged for inward and outward sliding movement in a housing or guide 255 mounted on the inner side of the door adjacent to the lower corner of the bottom panel 41. The bolt is spring projected to latching position in any suitable manner, such as by the arrangement of a spring 256 in a slot 254a in the bolt, one end of this spring engaging the outer end of the slot and the other end of said spring engaging a stationary cross bar 255a extending from the housing 255 transversely through the inner end of the slot. The pull-down rope 252 has any suitable connection with the latching bolt 254 in such a way that a downward pull on the looped portion of the rope tends to retract the bolt inwardly against the pressure of the spring 256. For example, the rope may pass around a guide sheave 257 and thence pass upwardly between two cooperating sheaves 258 mounted on the inner end of the bolt. The end of the rope passing downwardly from the guide sheave 257 is connected to the side jamb at 252a (Figure 3) with a length of slack intervening. The portion of the rope passing inwardly of the door from between the sheaves 258 may be fastened to the door or may be extended to the opposite edge thereof for passing between the guide sheaves 258 on a corresponding latching bolt 254 at the opposite edge of the door, this portion of the rope thence passing down around a lower guide sheave 257 and being extended to a fixed point of attachment on the opposite jamb, in the same relation as has been described of the latching bolt illustrated. These bolts are adapted to cooperate with stationary stop shoulders 259 which are mounted on the curved portions 53 of the guide tracks. When the door is moved up to open position, the sloping nose portions of the bolts 254 are cammed inwardly in passing the stop projections 259, and then snap outwardly on the upper sides of said stop projections for holding the door open. Each stop projection is mounted on the curved portion of its track at a point where it will hold the door in its maximum open position. Thus the door is latched against rebound when moved up to open position, and by holding the door with the bottom edge of its lower panel at a relatively high point on the curved portions of the tracks the maximum amount of head room through the doorway is obtained and in this manner the overhead clearance required for the installation of the door can be reduced. Pulling down on one of the loops of the rope 252 at either side of the door is operative to release both latches 254 so that the door can be pulled down to closed position.

In Figure 38 I have illustrated a relatively simple form of locking device for automatically arresting descent of the door if one of the counterbalancing cables 58 should break or become released. The lower end of each cable 58 is connected to the door through a locking dog 260 which is pivotally mounted at 261 on a bracket 262 which is secured to the edge or side portion of the door adjacent to the lower corner thereof. Each dog comprises a nose or shoulder portion 263 which, in the event of breakage of the counterbalancing cable, is adapted to be projected outwardly into any one of a series of holes 108 in the web portion of the adjacent vertical track section. A spring 264 is arranged so as normally to tend to swing the dog 260 outwardly into locking position. The lower end of the counterbalancing cable is linked to an eye 265 in the locking dog. This point of attachment 265 is so related to the pivot 261 and to the locking shoulder 263 that the counterbalancing tension normally pulling upwardly through the cable holds the dog 260 in an inwardly oscillated position, substantially as shown, in opposition to the action of the spring 264. If any of the counterbalancing cables, sheaves or springs should break or become unfastened, or if any condition should arise whereby counterbalancing tension is not transmitted through the dog 260 at either side of the door, whereupon such dog or dogs will instantly be swung outwardly to bring their shoulders 263 into engagement with the nearest holes 108 for preventing the possibility of the door falling to closed position.

In Figures 39 and 40 I have illustrated an improved hinge and method of constructing the same, this type of hinge being adapted to support the axle pin of the associated guide roller and hence having particular cooperation with these overhead doors. This hinge comprises two plate portions 267 and 268 adapted for attachment to the edges of adjoining panels. The hinge edge of one plate has a cylindrical loop 269 formed therein, and the other plate 268 likewise has a looped portion 270 formed in its hinge edge. The loop 269 on the plate 267 extends across the entire width of its plate. The loop 270 on the plate 268 is narrower than the width of its plate, having its ends terminating in spaced relation to the side edges of the plate. The narrow loop 270 is made of a diameter which snugly embraces the inner, wide loop 269, whereby a close fitting rotative joint is established between the two loops or beads 269 and 270. In stamping out the blank 267 a slot 271 is punched out of the metal at a point which will dispose this slot at the base and under side of the loop 269 which is subsequently rolled in the blank. This slot is of substantially the width of the other loop portion 270. In forming the other blank 268, the tongue of metal which is to form the loop or bead 270 is first rolled through approximately a half circle, which leaves the end of said tongue extending rearwardly in approximately the relation indicated in dotted lines at z in Figure 40. This tongue is then threaded up through the slot 271. Thereupon the extending portion z is rolled around the outer side of the loop 269 so that the substantially complete outer loop 270 is formed embracing practically the entire circumference of the inner loop 269. In punching out the slot 271 sufficient metal may be completely removed to form the required depth of slot to permit the tongue of the other blank to be threaded up therethrough; or, only a relatively small amount of metal may be removed and narrow slits 272 may be punched inwardly or upwardly from the side margins of the slot to free a tongue of metal 273 which is then rolled into the contour of the inner loop 269 so that said tongue forms a circular part of the loop, the inward and upward rolling of this tongue extension then giving the necessary depth of slot 271 for receiving the tongue on the other blank 268.

It will be seen that the foregoing construction provides a hinge in which the two stampings in and of themselves complete the pivot connection without the necessity of a separate hinge pin, and that the inner loop 269 provides a cylindrical bearing extending across the entire width of the hinge for receiving one of the pivot pins 57 on which the guide roller 47 is mounted. Because the pin 57 when mounted in the loop 269 forms no part of the hinge structure where it would be subject to contact with oppositely moving bearing surfaces and thus be subject to binding from wear, this pin 57 can have a free floating mounting in the hinge, viz., it can slide freely back and forth in the loop 269 for accommodating any variations in the spacing between the edge of the door and the guide track. This is a very desirable advantage because it prevents binding of the guide rollers against the side walls or flanges of the track and avoids the necessity of extreme accuracy in installing the track to get the proper spaced relation to the door. Of course, if desired the rollers may be held against sidewise shifting relatively to the door. The preferred arrangement is with the roller axes coincident with the hinge axes and approximately flush with the inner surface of the door, but the roller axes may be arranged substantially medially of the thickness of the panels, as shown in Figures 8 and 9.

Figures 41 and 42 illustrate an improved guide roller for the overhead door, and an improved method of making the same. The outer end of the pin 57 is provided with an enlarged head 275 which is either formed integrally with the pin or consists of a collar mounted thereon. An annular groove 276 is formed in this head to provide an inner race for receiving a series of ball bearings 277. The outer race and web portion of the wheel consists of two duplicate stampings 278 and 278a. These stampings are in the form of circular discs both having central apertures sufficiently large to pass freely over the head portion 275 of the pin 57. Around these central openings the metal is bowed or swaged outwardly to form the annular depressions 275 which are so proportioned that when the outwardly extending flat portions of the discs are brought into abutting contact the opposite depressions will match to form a substantially complete semi-circular outer race for the balls 277. The periphery of the roller is formed by a separate cup-shaped stamping initially comprising the outer longitudinally extending flange 280 and the inwardly extending flange 281. The flange 280 slips snugly over the peripheries of the two disc stampings 278 and 278a, as shown in Figure 41. In completing the assembly of the wheel the two disc stampings are brought together over the balls 277 and the outer peripheral stamping is slipped over said discs with the end flange 281 snugly engaging the outer side of the adjacent disc, whereupon the projecting portion of the longitudinal flange 280 is rolled or spun downwardly to securely engage the outer side of the other disc, as indicated at 280a in Figure 42. In this operation of rolling or crimping the peripheral flange 280 down into embracing engagement with the other disc the outer corners or edges may be appropriately rounded so that the periphery of the finished wheel will be of semi-circular or rounded cross section. As will be evident from the foregoing, the balls 277 and the disc portions 278 and 278a are all interlocked together within the peripheral portion 280 and it is hence impossible for the wheel to come apart or for any of the parts to work loose or to shift along the head 275.

In Figures 43-50 I have illustrated an electrically operated door incorporating several of the features disclosed in the embodiment of Figures 8-11, i. e., it has the same general relation of winding drums mounted directly on the door and serving to propel the door to overhead position by winding up along the lengths of the cables which are anchored in substantially fixed relation to the tracks, and it has the same general relation of counterbalancing means carried by the door and acting through these winding drums. The winding drums 85a are preferably disposed between the side edges of the door and the guide tracks 51, substantially the same as the winding drums 85 of Figures 8-11, and the cables 58 extend upwardly therefrom and then rearwardly around the curved supporting members 101 to points of anchorage adjacent to the inner ends of the horizontal track portions, as described of the preceding embodiment. In this embodiment, however, a second cable 58a is also secured to each drum 85a and has its lower end extending downwardly to a point of anchorage adjacent to the bottom of each track. The latter cable winds on the drum oppositely to the cable 58 so that, with the door in its overhead position, rotation of the two drums in such a direction as will pay out the cables 58 will also wind up the cables 58a and thus positively pull the door around the curved portions of the tracks and down into closed position. The winding drums 85a are mounted on rotating shafts or sleeves 86a journaled within the housing structures 89a, and the door is more or less counterbalanced by the coiled torsion springs 95a each of which is connected to a collar 97a on the associated rotating member 86a and is connected at its other end to a block 92a secured to the housing, this arrangement being substantially the same as previously described in connection with Figure 10.

The electric motor 285 is mounted directly on the door and has geared connection with the winding shaft or sleeve 86a, as shown in Figures 45 and 46. A worm wheel 286 mounted on the shaft 86a is adapted to transmit rotation thereto, and meshing with this worm wheel is a worm 287 secured to a vertical drive shaft 288. A worm drive is preferable because its pitch angle may be made sufficiently steep so that the door is positively locked in any of its different positions, but it will be understood that bevel or other types of gear drives might be used. The axis of the winding drums 85a may be disposed adjacent to the lower edge of the door, although in the preferred arrangement I group these parts between the bottom panel 41 and the second panel 42 with said axis substantially concentric with the hinge axis between these panels. In such arrangement, the housing 289 which encloses the worm wheel 286 is secured to the second panel 42 by bolts 291 passing through a flange 292 projecting upwardly from the inner side of the housing. Said housing is cylindrical where it embraces the worm wheel 286, and is formed with an inwardly projecting portion 293 for enclosing the worm 287 and for providing bearing supports for the shaft 288. As shown in Figure 45, the end portions of the intermediate cylindrical housing 289 are provided with bearings 294 for the shaft 86a. An arcuate plate or casing member 295 embraces the outer side of the intermediate casing 289 and is rigidly secured to the lower panel 41, the inner side of this casing portion being recessed at 296 to accommodate the housing extension 293 in the relative folding movement of the panels as they pass around the curved portions of the tracks. The outwardly extending housings 89a are cylindrical, and laterally extending flange portions 295' of the lower casing portion 295 are rigidly secured to these cylindrical housings 89a. Bearing collars 297 at the ends of said cylindrical housings 89a engage with the shaft 86a, and thus a rotatable hinge connection is established between the housings 89a and the intermediate housing 289 through the shaft 86a. Referring to Figure 43, outwardly disposed hinge connections are established by clips or brackets 298 which rotatably engage the end portions of the cylindrical housings 89a and are secured to the second panel 42, and by clips or brackets 299 which extend down from the cylindrical housings and are secured to the lower panel 41.

Referring to Figure 45, the worm wheel 286 has an interruptible driving connection with the shaft 86a through a shiftable clutch collar 301 which is slidably keyed to the shaft at 302 and which has clutch pins 303 adapted to enter sockets in the side of the worm wheel. A compression spring 304 normally tends to hold the collar shifted to the left with the clutch pins 303 in engagement with the sockets in the worm wheel whereby the latter is normally operatively connected to the shaft 86a. A shifting cam or lever 305 engages in the groove in the shiftable collar 301 and is mounted on a shaft extending out through the inner side of the intermediate housing 289, being provided at its projecting end with a handle or screw slot 307 by the rotation of which the clutch collar 301 can be moved to releasing position, the shifting cam having a flat spot thereon for holding the collar in this position until the cam is rotated in the other direction. Thus, the power drive to the drums 85a can be quickly released for manually operating the door, which might be desirable in the event that the current should fail.

The electric motor 285, which is of the reversible type, is preferably mounted on one of the upper panels, such as the panel 43, although it might be mounted on the same panel carrying the worm 287 and shaft 288. In the illustrated arrangement, the armature shaft of the motor is connected through a universal joint 309 with the upper end of a shaft 311, the lower end of which is connected through a universal joint 312 with the upper end of the shaft 288. The upper portion of the latter shaft is journaled in a bearing 313 which is secured to the upper portion of the panel 42. The pivot axis of the universal joint 312 is disposed in proximity to and in substantially the same horizontal plane as the hinge axis 45 between the panels 42 and 43, so that folding movement between these two panels in traveling around the curved portions of the tracks will not interfere with the transmission of power from the motor to the worm 287.

Figure 44:
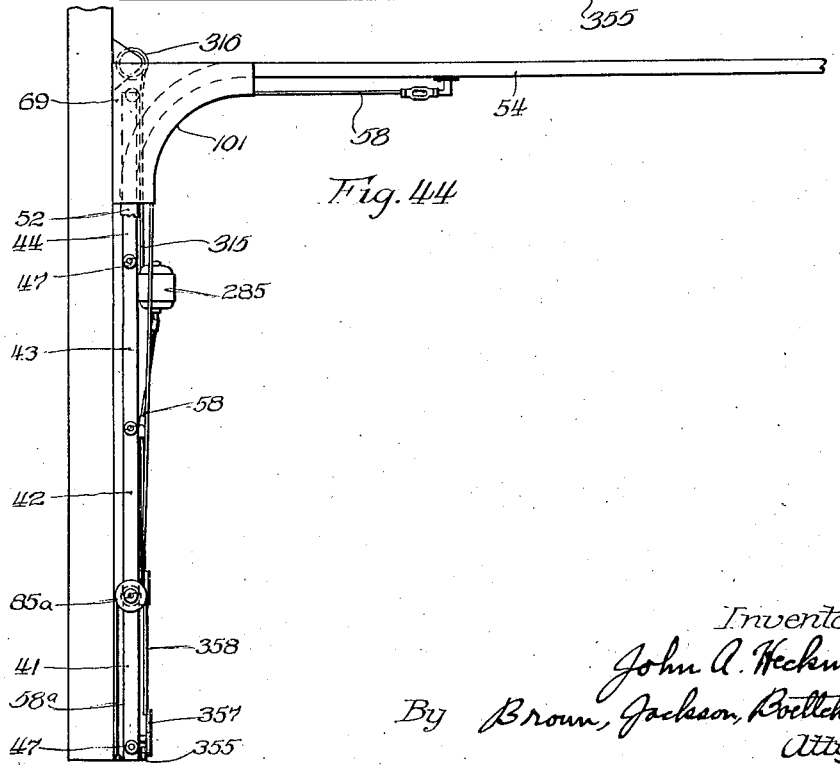
Figure 44 is a side view thereof.

The conductors leading to the motor 285 are embodied in a flexible cable 315 which evtends upwardly to a spring actuated winding drum 316 mounted above the doorway and on which the cable is adapted to wind. Referring to Figures 48 and 49, the spring drum 316 is secured to a shaft 317 which has its ends rotatably mounted in the side arms 318 of a U-shaped bracket 319 which is stationarily mounted above the doorway. The drum preferably comprises two cup-shaped shells 321 and 322 having their web portions 323 adjoining and secured to the shaft 317 at 324, the outer ends of these shells having outwardly extending marginal flanges 325 for confining the conductor cable 315 on the drum. A spiral spring 326 within the shell 321 has one end anchored to the rotating shaft 317 and has its other end connected to a screw or abutment 327 extending inwardly from the adjacent bracket arm 318. Mounted on a cup-shaped supporting member 328 within the shell 322 and insulated therefrom are three slip rings 331, 332 and 333. Three spring pressed contacts 334, 335 and 336 have insulated mounting in the adjacent bracket arm 318 and conduct current to these slip rings. Connectors 337 and 338 extend outwardly from the two innermost rings 331 and 332, respectively, and connect with binding posts 339 and 341 both having insulated mounting in the adjacent side flange 325. Conductors 342 and 343 lead from these binding posts to the conductor cable 315. The adjacent end of said cable is anchored in a bushing 344 which is pivoted at 345 in the end of an arcuate link 346. This link is preferably of channel-shaped cross section to support the two conductors 342 and 343 extending out through the bushing 344 into the cable 315, and the inner end of said link is pivotally connected at 347 to the adjacent side flange 325 of the spring drum. Said link is curved on the same radius as the winding surface of the drum, and normally this link snugly embraces the drum. The link is designed to have an automatic circuit breaking function when the door reaches the limit of its overhead travel, and to this end is provided with a disconnecting element 348 which is adapted to enter an opening 349 in the winding surface of the drum and to contact with switch blade extensions 351 projecting from the outer slip ring 333 substantially in line with the opening 349. The upper switch blade 348 is connected with a wire 353 (Figure 50) also extending out through the conductor cable 315, the blade either being insulated from the arcuate link 346 or being connected to its wire 353 through a grounded connection through said link 346. It will be apparent that as the conductor cable approaches the limit of its unwinding movement from the spring drum it swings the link 346 outwardly away from the drum, substantially into the line of pull of the cable, as shown in Figure 48, and this swings the contact 348 out of engagement with the contacts 351, thereby interrupting the current path from the slip ring 333 to the conductor 353. Conversely, when the drum again starts to wind up the cable the link 346 swings inwardly and reestablishes the engagement between the contacts 348 and 351, thereby again restoring said current path. The contact 351 may be constructed with spaced switch blade jaws having their upper edges turned outwardly so as to accurately guide the contact 348 into engagement therewith when the link 346 swings inwardly into engagement with the drum. As I have previously remarked, the breaking of the circuit between the contacts 348 and 351 automatically interrupts the circuit to the motor 285 when the door reaches a predetermined limit in its overhead travel. As shown in Figures 43 and 44, the conductor cable 315 extends up along the inner side of the door to the spring drum 316 and consequently when the door starts in its upward movement the cable is caused to loop over the upper edge of the top panel and to be gradually unreeled from the spring drum as this upper edge of the door moves rearwardly on the horizontal track portions. The length of the cable is so proportioned that when this edge of the door reaches a predetermined limit of travel the cable will have unwound to the point where the link 346 is caused to swing outwardly away from the reel or drum for separating the contacts 348, 351 and interrupting the operation of the motor.

The downward movement of the door towards its closed position is also automatically controlled by mechanism which I shall now describe. Referring to Figure 43, a switch controlling bar 355 extends across substantially the entire width of the door at the bottom thereof and is suspended therefrom by a series of parallel links 356 which are pivoted to the door and to the bar. When the door is in an elevated position these links allow the bar 355 to hang below the edge of the door so that the said bar will encounter the ground sill, or any other object in the doorway, in advance of the bottom edge of the door. A lever 357 is pivotally connected to said bar and to the central portion of the door and the upper arm of this lever has connection through a chain or rope 358 with a pull switch 359 mounted preferably adjacent to the motor 285. This switch is of any suitable type adapted to be moved to open circuit position when a downward pull is transmitted thereto through the flexible pull member 358, and which is adapted to be moved to closed circuit position when tension is released from the member 358. This switch controls the motor circuit when the door is moving toward its closed position, and it will be evident that when the contact sensing bar 355 engages the ground sill, just in advance of the door engaging this sill, the lever 357 will be oscillated to pull down through the flexible member 358 and to open the switch 359 for stopping the operation of the motor. The flexible connection 358 does not interfere with relative folding movement between the panels as they travel around the curved portions of the tracks. This cord 358 passes through screw eyes or pulleys 361 fastened to the door adjacent to each hinge line between adjoining panels so that the cord is taut and operative to trip the switch 359 even when the panels are traveling around the curved portions of the tracks. Any suitable stop means is associated with the bar 355 or links 356 so that the links cannot swing straight down to a dead center position but are always held to the same side of this dead center alignment whereby the bar 355 will always swing upwardly in the same direction to properly actuate the lever 357.

Referring now to the circuit diagram, Figure 50, the source of current supply is connected through conductors 362 and 363 to one of the slip rings 331 or 332 and to the movable switch element of a manually operated reversing switch 364. This manually operated switch may be located either inside or outside of the garage. A conductor 365 extends from one terminal of this switch to the other slip ring 331, and a conductor 366 extends from the other terminal of said switch to the third slip ring 333. When the switch 364 is thrown to the position shown current is conducted through the conductors 343 and 353 to the windings of the motor 285, passing through said windings in such relation as to cause the motor to operate in a direction for moving the door to its overhead position. As previously described, when the door reaches the limit of its overhead travel the circuit through the conductor 353 is interrupted by the separation of the contacts 348 and 341. When the switch 364 is thrown over to the opposite terminal current is conducted through the conductors 342 and 343 to the windings of the motor, the current at this time passing from the conductor 343 down through a shunt connection 368 and through the circuit opening switch 359, and passing through the windings of the motor in such relation as to cause the motor to revolve in the other direction for moving the door down to its closed position. When the door reaches the limit of its downward travel the switch 359 is opened through the lifting of the cross bar 355 and the circuit of the motor is interrupted. In connection with the latter circuit opening function, attention is directed to the fact that it automatically safeguards the door against the possibility of the door accidentally descending, as from the accidental throwing of the switch 364 to its other side, and thereby injuring a car passing through the doorway or a person standing in the doorway. That is to say, as soon as the contact sensing bar 355 contacts with any object in the doorway it trips the switch 359 and stops the descent of the door before the lower edge thereof can do any damage.

It will be understood that this electrically operated embodiment may be provided with any of the previously described top panel controlling mechanisms and with any of the previously described mechanisms for tightly closing the door against the jambs.

While in the preceding disclosures I have shown what I regard to be the preferred embodiments of my invention, nevertheless it will be understood that such embodiments are merely exemplary and that various modifications and re-arrangements may be made without departing from the essence of the invention. It will also be understood that different features disclosed in certain embodiments may be combined with other features of other embodiments. For example, any of the several counter-balancing mechanisms may be associated with any of the several top panel controlling mechanisms in the same door, and, likewise, any of the several mechanisms for sealing the door against weather may be associated with any desired embodiment of counter-balancing mechanism and top panel controlling mechanism in the same door, and such is also true of the locking mechanisms and other detail parts.

I claim:

1. In a door adapted to move from its closed position in a doorway to an overhead open position at an angle to said doorway, said door comprising a plurality of superposed folding panels, the combination of guide members mounted on the panels adjacent to the sides thereof, tracks for said guide members comprising sections extending upwardly adjacent to the sides of the doorway, sections extending overhead at an angle to the plane of said doorway, and curved sections joining the upwardly and angularly extending sections, and counterbalancing mechanism for said door comprising two inner sheave blocks movable towards and away from each other in a plane substantially parallel to the plane of said doorway, spring means connected with said sheave blocks tending to move said sheave blocks towards each other, two outer sheave blocks disposed outwardly of said inner sheave blocks substantially in the plane of movement of said inner sheave blocks, and two flexible members extending substantially parallel to said vertical track sections and each reeved around one of said outer sheave blocks and the adjacent one of said inner sheave blocks and operatively connected to establish counterbalancing forces in said door.

2. In a door adapted to move from its closed position in a doorway to an overhead open position, the combination of guide members on the doorway, tracks for said guide members comprising sections extending upwardly adjacent to the sides of said doorway and sections extending overhead away from the plane of the doorway, and counterbalancing mechanism for said door comprising a tension spring, two inner sheave blocks connected to opposite ends of said spring and movable towards and away from each other, two outer sheave blocks disposed outwardly of said inner sheave blocks substantially in the plane of movement of said inner sheave blocks, and two flexible members extending substantially parallel to said vertical track sections and each reeved around one of said outer sheave blocks and the adjacent one of said inner sheave blocks and operatively connected to establish counterbalancing forces in said door, said tension spring in transmitting tension from opposite ends thereof serving to establish equalized counterbalancing forces in both sides of the door.

3. In a door adapted to move from its closed position in a doorway to an overhead open position, the combination of guide members on the door, tracks for said guide members comprising sections extending upwardly adjacent to the sides of said doorway and sections extending overhead away from the plane of the doorway, and spring actuated counterbalancing mechanism for said door mounted on the door, comprising a spring having one end thereof operatively connected to counterbalance one edge of the door and having the other end thereof operatively connected to counterbalance the other edge of said door.

4. In a door adapted to move from its closed position in a doorway to an overhead open position, the combination of guide members on the door, tracks for said guide members comprising sections extending upwardly adjacent to the sides of said doorway and sections extending overhead away from the plane of the doorway, flexible members disposed adjacent to the sides of the door, rotatable members mounted on the door coacting with said flexible members in the raising and lowering of the door, spring counterbalancing mechanism for the door mounted on the door and operating through said rotatable members, and mechanism for moving the door from one position to another comprising an electric motor mounted on the door and operating through said rotatable members.

5. In a door adapted to move from its closed position in a doorway to an overhead open position at an angle to said doorway, said door comprising a plurality of superposed folding panels, the combination of guide members mounted on the panels adjacent to the sides thereof, tracks for said guide members comprising sections extending upwardly adjacent to the sides of the doorway and sections extending overhead at an angle to the plane of the doorway, and counterbalancing mechanism for said door comprising four sheave blocks disposed substantially in a plane above the doorway and substantially parallel thereto, bracket means supporting the two outer sheave blocks, a tension spring connected to the two inner sheave blocks, said inner blocks being movable towards and away from each other, and two flexible members each reeved around one of said outer sheave blocks and the adjacent one of said inner sheave blocks and extending down to a point of connection with the door adjacent to each side thereof.

6. In a door adapted to move from its closed position in a doorway to an overhead open position, the combination of guide members on the door, tracks for said guide members comprising sections extending upwardly adjacent to the side of said doorway and sections extending overhead away from the plane of the doorway, and counterbalancing mechanism for said door comprising a pair of outer sheaves mounted on the door, a pair of inner sheaves disposed substantially between said outer sheaves and moving with the door, tension spring means connected to said inner sheaves, said latter sheaves being movable towards and away from each other, and two flexible members each passing around one of said outer sheaves and the adjacent one of said inner sheaves and extending to a point of anchorage above the door.

7. In a door adapted to move from its closed position in a doorway to an overhead open position, the combination of guide members on the door, tracks for said guide members comprising sections extending upwardly adjacent to the sides of said doorway and sections extending overhead away from the plane of the doorway, a pair of flexible members each stationarily anchored at one end and extending down approximately parallel to said guide tracks at each side of the door, a pair of rotating members mounted on the door and rotating about axes extending substantially parallel to the door, said flexible members engaging with said rotating members, and spring means carried by the door and cooperating with said rotating members for counterbalancing the door through said flexible members.

8. In a door adapted to move from its closed position in a doorway to an overhead open position at an angle to said doorway, said door comprising a plurality of superposed folding panels, the combination of guide members mounted on the panels adjacent to the sides thereof, tracks for said guide members comprising sections extending upwardly adjacent to the sides of the doorway and sections extending overhead at an angle to the plane of said doorway, shaft means carried by the door and extending substantially parallel thereto, rotary members mounted on said shaft means adjacent to the sides of said door, a spring coiled about said shaft means and tending to revolve said rotary members, and flexible members cooperating with said rotary members for counterbalancing the door.

9. In a door adapted to move from its closed position in a doorway to an overhead open position, the combination of guide members on the door, tracks for said guide members comprising sections extending upwardly adjacent to the sides of said doorway and sections extending overhead away from the plane of the doorway, mechanism for counterbalancing the door, and mechanism carried by the door and movable therewith for interrupting descent thereof in the event of failure of said counterbalancing mechanism.

10. In a door adapted to move from its closed position in a doorway to an overhead open position, the combination of guide members on the door, tracks for said guide members comprising sections extending upwardly adjacent to the sides of said doorway and sections extending overhead away from the plane of the doorway, and mechanism mounted on the door serving to cunterbalance the same, and comprising locking parts serving to automatically lock the door against descent in the event of failure of the counterbalancing function, and including a manually operated member coacting with said locking parts and actuatable to manually lock the door in closed position.

11. In a door adapted to move from its closed position in a doorway to an overhead open position at an angle to said doorway, said door comprising a plurality of superposed folding panels, the combination of guide members mounted on the lower panels adjacent to the sides thereof, tracks for said guide members comprising sections extending upwardly adjacent to the sides of the doorway and curved sections curving rearwardly from said latter sections below the top of the doorway, levers pivotally mounted on the top panel, rollers at the inner ends of said levers engaging with the curved sections of said tracks, the other ends of said levers projecting forwardly towards the front side of the door and cam members cooperating with the forwardly projecting ends of said levers for closing the top panel against the upper portion of the doorway when the door is moved to closed position.

12. In a door adapted to move from its closed position in a doorway to an open position to clear said doorway, the combination of guide rollers mounted on the door adjacent to the sides thereof, tracks for said rollers adjacent to the sides of the doorway, substantially vertical jamb members movably supported at the sides of the doorway, means for supporting said jamb members for movement in a direction downward and towards the door or upward and away from the door, and arms carried by and extending beyond the jambs members at substantially right angles thereto at the lower ends thereof and in directions substantially parallel to the planes of movement of said jamb members, said arms being adapted to be engaged by the lower guide rollers whereby in the latter part of the closing movement of the door said jamb members are carried downwardly and rearwardly into closed position against the door.

13. In a door adapted to move from its closed position in a doorway to an overhead open position, the combination of side members extending upwardly along each side of the doorway, means movably supporting said members for upward and downward movement with the door and for movement at an angle to the plane of the doorway whereby said members cooperate with the door and side jambs of the doorway to effect a substantially weather-tight closure, and automatically releasing holding means for holding said members in their elevated positions.

14. In a door adapted to move from its closed position in a doorway to an overhead open position the combination of guide rollers mounted on the door, tracks for said guide rollers comprising substantially vertical track sections disposed at each side of the doorway, means supporting said track sections for upward and inward movement away from the doorway and downward and outward movement toward the doorway, and mechanism for positively compelling upward movement of said track sections with the initial opening movement of the door and for holding said track sections in elevated position until said door is again returned to closed position.

15. In a door adapted to move from its closed position in a doorway to an overhead open position at an angle to said doorway, said door comprising a plurality of superposed folding panels, the combination of guide rollers mounted on the panels adjacent to the sides thereof, tracks for said guide rollers comprising substantially vertically extending sections adjacent to the sides of the doorway and inwardly extending sections projecting overhead, locking bolts carried by one of said panels and adapted to be projected outwardly for locking the door in closed position, said substantially vertical track sections having slots therein for receiving said bolts, and plates carried by said substantially vertical track sections and adjustably movable therealong for adjusting the effective upper limits of said slots.

16. In a door adapted to move from its closed position in a doorway to an overhead open position, the combination of guide members on the door, tracks for said guide members comprising sections extending upwardly adjacent to the sides of said doorway and sections extending overhead away from the plane of the doorway, tapered surfaces adjacent to the edges of the door, tapered in a plane parallel to the door and downwardly in a diminishing width toward the bottom of the door, and means forming tapered surfaces associated with the sides of the doorway, tapered in the plane of the doorway and extending down to a diminishing width adjacent to the bottom of the doorway, the tapered surfaces on said door being adapted to engage said latter tapered surfaces when the door is closed to form a substantially weather-tight joint between the door and doorway.

17. In a door adapted to move from its closed position in a doorway to an overhead open position at an angle to said doorway, said door comprising a plurality of superposed folding panels, the combination of guide rollers mounted on the panels adjacent to the sides thereof, tracks for said guide rollers comprising sections extending upwardly adjacent to the sides of the doorway and sections extending overhead at an angle to the plane of said doorway, tapered surfaces on the upwardly extending sections of said tracks tapered substantially in the plane of the doorway and with a diminishing width toward the bottom of the doorway, and plates mounted on said panels at the edges thereof, said plates having tapered outer surfaces tapered in the plane of the door and with a diminishing width toward the bottom of the door, the tapered surfaces on the door being adapted to engage with the tapered surfaces on said track sections when the door moves into closed position for producing a substantially weather-tight joint between the door and doorway.

18. In a door adapted to move from its closed position in a doorway to an overhead open position, the combination of guide members on the door, tracks for said guide members comprising sections extending upwardly adjacent to the sides of said doorway and sections extending overhead away from the plane of the doorway, and mechanism for moving the door from one position to another comprising an electric motor mounted on the door, rotating members mounted on the door adjacent to the sides thereof and driven by said motor, and members adjacent to said tracks with which said rotating members cooperate for raising said door to its open position.

19. In a door adapted to move from its closed position in a doorway to an overhead open position, the combination of guide rollers on the door, tracks for said guide rollers comprising sections extending upwardly adjacent to the sides of said doorway and sections extending overhead away from the plane of the doorway, flexible members adapted to extend along a portion of the path of movement of the door, mechanism for moving the door from one position to another comprising an electric motor mounted on the door and devices driven by said motor and cooperating with said flexible members to move the door, and means for counterbalancing the door.

20. In a door adapted to move from its closed position in a doorway to an overhead open position, the combination of guide members on the door, tracks for said guide members for guiding the door between its open and closed positions, power driven mechanism for moving the door from one position to another, and contact sensing means carried by the door and adapted to contact, in advance of the door, with any object or surface lying in the downward path of movement of the door and adapted in response to such contacting to actuate means for interrupting the operation of said power driven mechanism.

21. In a door adapted to move from its closed position in a doorway to an overhead open position, the combination of tracks for guiding the door between its open and closed positions, mechanism for moving the door from one position to another comprising an electric motor mounted on the door, a conductor cable extending to said motor, and means controlled by movement of said cable in response to movement of said door for interrupting the operation of said electric motor.

22. In a door of the class described adapted to move from its closed position in a doorway to an overhead open position at an angle to said doorway, said door comprising a plurality of superposed folding panels, the combination of guide rollers mounted on the panels adjacent to the sides thereof, tracks for said guide rollers comprising sections extending upwardly adjacent to the sides of the doorway, sections extending overhead at an angle to the plane of said doorway, and curved sections joining the upwardly and angularly extending sections, said curved sections being curved on a relatively large radius, said upwardly extending sections having rearwardly curved upper ends curved on a comparatively short radius and adapted to align substantially with the lower ends of said curved sections, and means movably supporting said upwardly extending sections for movement toward and away from the doorway.

23. In a door adapted to move from its closed position in a doorway to an overhead open position at an angle to said doorway, said door comprising a plurality of superposed folding panels, the combination of guide members mounted on the panels adjacent to the sides thereof, tracks for said guide members comprising sections extending upwardly adjacent to the sides of the doorway, sections extending overhead at an angle to the plane of said doorway, and curved sections joining the upwardly and angularly extending sections, and counterbalancing mechanism for said door comprising counterbalancing means at one edge of said door, counterbalancing means at the other edge of said door, and a counterbalancing spring having one end connected to one of said counterbalancing means and its other end connected to the other of said counterbalancing means for automatically and constantly transmitting equalized counterbalancing forces to the opposite edges of the door whereby the counterbalancing pull at one edge of the door is always equal to the counterbalancing pull at the other edge of the door.

24. In a door adapted to move from its closed position in a doorway to an overhead open position at an angle to said doorway, said door comprising a plurality of superposed folding panels, the combination of guide members mounted on the panels adjacent to the sides thereof, tracks for said guide members comprising sections extending upwardly adjacent to the side jambs at the sides of the doorway and sections extending overhead at an angle to the plane of the doorway, a flexible pull-down member operatively connected with the door for pulling the same downwardly from its open position, one end of said flexible member being connected to one of said side jambs, and latch mechanism for holding the door in open position, arranged to be released by said pull-down member.

25. In a door adapted to move from its closed position in a doorway to an overhead open position at an angle to said doorway, said door comprising a plurality of superposed folding panels, the combination of guide members mounted on the lower panels adjacent to the sides thereof, tracks for said guide members comprising sections extending upwardly adjacent to the sides of the doorway and curved sections curving rearwardly from said latter sections below the top of the doorway, and mechanism for controlling the top panel of the door comprising rollers adapted to engage with the curved sections of said tracks, means movably connecting said rollers with said top panel whereby said rollers are capable of movement toward and away from said panel, guide devices carried by said top panel, and relatively stationary guide surfaces disposed between said tracks and said doorway and coacting with said latter guide devices.

26. In a door adapted to move from its closed position in a doorway to an overhead open position at an angle to said doorway, said door comprising a plurality of superposed folding panels, the combination of guide rollers mounted on the lower panels adjacent to the sides thereof, tracks for said lower guide rollers comprising sections extending upwardly adjacent to the sides of the doorway, curved sections extending from said first sections and curving rearwardly away from the plane of the doorway, said curved sections starting their rearward curvature at a point below the top of the doorway, overhead sections extending rearwardly from the inner ends of said curved sections, and mechanism for controlling the top panel of the door comprising top panel rollers, means movably connecting said top panel rollers with said top panel whereby said latter rollers are capable of movement toward and away from said panel, guide surfaces disposed above said curved track sections, and guide devices carried by said top panel and coacting with said guide surfaces.

JOHN A. HECKMAN.